US012715224B2

(12) United States Patent
Mochizuki et al.

(10) Patent No.: US 12,715,224 B2
(45) Date of Patent: Aug. 25, 2026

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventors: Yugo Mochizuki, Kanagawa (JP); Yuto Kajiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 18/595,640

(22) Filed: Mar. 5, 2024

(65) Prior Publication Data

US 2024/0316950 A1 Sep. 26, 2024

(30) Foreign Application Priority Data

Mar. 20, 2023 (JP) ................................ 2023-044721

(51) Int. Cl.
*B41J 2/21* (2006.01)
*B41J 2/175* (2006.01)
*B41J 2/465* (2006.01)

(52) U.S. Cl.
CPC ......... *B41J 2/2132* (2013.01); *B41J 2/17566* (2013.01); *B41J 2/211* (2013.01); *B41J 2/465* (2013.01); *B41J 2002/17569* (2013.01)

(58) Field of Classification Search
CPC ...... B41J 2/2132; B41J 2/17566; B41J 2/211; B41J 2/465; B41J 2002/17569
See application file for complete search history.

(56) References Cited

U.S. PATENT DOCUMENTS

| | | | | |
|---|---|---|---|---|
| 8,873,103 | B2 | 10/2014 | Tsuchiya | |
| 9,262,705 | B2 | 2/2016 | Nakatani | |
| 10,792,916 | B2 | 10/2020 | Goto | |
| 11,014,372 | B2 | 5/2021 | Yamaguchi | |
| 2007/0176965 | A1* | 8/2007 | Arazaki | G06K 15/102 347/41 |
| 2013/0061767 | A1* | 3/2013 | Casals | B41J 11/0015 101/202 |
| 2022/0169036 | A1* | 6/2022 | Murayama | B41J 2/2135 |
| 2025/0103839 | A1 | 3/2025 | Kajiwara | |

FOREIGN PATENT DOCUMENTS

| | | |
|---|---|---|
| JP | 2006-346931 A | 12/2006 |

* cited by examiner

*Primary Examiner* — Jason S Uhlenhake
(74) *Attorney, Agent, or Firm* — Venable LLP

(57) ABSTRACT

The present disclosure aims to reduce bleeding occurring near a border between image regions with different color ink densities. An embodiment of the present invention is a printing apparatus having a printhead ejecting a color ink and a reaction liquid reacting with the color ink and an application amount control unit that controls a reaction liquid application amount by, in image data representing the reaction liquid application amount of each pixel, estimating bleeding for each pixel and then according to the estimated bleeding, executing processing near a border between image regions having different color ink densities, the image regions being a first region having a first reaction liquid density and a second region having a second reaction liquid density lower than the first reaction liquid density, the processing being increasing the reaction liquid application amount for the second region based on the reaction liquid application amount for the first region.

27 Claims, 14 Drawing Sheets

| | | | | | | | | |
|---|---|---|---|---|---|---|---|---|
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |
| 255 | 255 | 255 | 255 | 20 | 20 | 20 | 20 | 20 |

K INK

| | | | | | | | | |
|---|---|---|---|---|---|---|---|---|
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |
| 80 | 80 | 80 | 80 | 10 | 10 | 10 | 10 | 10 |

RCT INK

FIG.10

| | | MASK VALUE | | | | | | | | | DETERMINATION VALUE | | | | | | | | | REPLACEMENT REFERENCE PIXEL | DISTANCE FROM REFERENCE PIXEL |
|---|---|---|---|---|---|---|---|---|---|---|---|---|---|---|---|---|---|---|---|---|---|
| | | a | b | c | d | e | f | g | h | i | a | b | c | d | e | f | g | h | i | | |
| 1st DETECTION PATTERN | BODY PIXEL INSIDE BODY WITH WIDTH OF 5 OR MORE | 1 | 1 | 1 | 1 | 1 | 1 | 0 | 0 | 0 | 1 | 1 | 1 | 1 | 1 | 0 | 0 | 0 | 0 | N/A | N/A |
| 2nd DETECTION PATTERN | NON-BODY PIXEL AWAY FROM BODY WITH WIDTH OF 4 OR MORE BY DISTANCE OF 1 | 1 | 1 | 1 | 1 | 1 | 0 | 0 | 0 | 0 | 1 | 1 | 1 | 1 | 0 | 0 | 0 | 0 | 0 | d | 1 |
| 3rd DETECTION PATTERN | BODY PIXEL INSIDE BODY WITH WIDTH OF 4 | 1 | 1 | 1 | 1 | 1 | 1 | 0 | 0 | 0 | 0 | 1 | 1 | 1 | 1 | 0 | 0 | 0 | 0 | N/A | N/A |
| 4th DETECTION PATTERN | BODY PIXEL INSIDE BODY WITH WIDTH OF 4 | 0 | 1 | 1 | 1 | 1 | 1 | 1 | 0 | 0 | 0 | 0 | 1 | 1 | 1 | 1 | 0 | 0 | 0 | N/A | N/A |
| 5th DETECTION PATTERN | NON-BODY PIXEL AWAY FROM BODY WITH WIDTH OF 3 OR MORE BY DISTANCE OF 2 | 1 | 1 | 1 | 1 | 1 | 0 | 0 | 0 | 0 | 1 | 1 | 1 | 0 | 0 | 0 | 0 | 0 | 0 | c | 2 |
| 6th DETECTION PATTERN | NON-BODY PIXEL AWAY FROM BODY WITH WIDTH OF 3 BY DISTANCE OF 1 | 1 | 1 | 1 | 1 | 1 | 1 | 0 | 0 | 0 | 0 | 1 | 1 | 1 | 0 | 0 | 0 | 0 | 0 | d | 1 |
| 7th DETECTION PATTERN | BODY PIXEL INSIDE BODY WITH WIDTH OF 3 | 0 | 1 | 1 | 1 | 1 | 1 | 0 | 0 | 0 | 0 | 0 | 1 | 1 | 1 | 0 | 0 | 0 | 0 | N/A | N/A |
| 8th DETECTION PATTERN | BODY PIXEL INSIDE BODY WITH WIDTH OF 3 | 0 | 0 | 1 | 1 | 1 | 1 | 1 | 0 | 0 | 0 | 0 | 0 | 1 | 1 | 1 | 0 | 0 | 0 | N/A | N/A |
| 9th DETECTION PATTERN | NON-BODY PIXEL AWAY FROM BODY WITH WIDTH OF 2 OR MORE BY DISTANCE OF 3 | 1 | 1 | 1 | 1 | 1 | 0 | 0 | 0 | 0 | 1 | 1 | 0 | 0 | 0 | 0 | 0 | 0 | 0 | b | 3 |
| 10th DETECTION PATTERN | NON-BODY PIXEL AWAY FROM BODY WITH WIDTH OF 2 BY DISTANCE OF 2 | 1 | 1 | 1 | 1 | 1 | 0 | 0 | 0 | 0 | 0 | 1 | 1 | 0 | 0 | 0 | 0 | 0 | 0 | c | 2 |
| 11th DETECTION PATTERN | NON-BODY PIXEL AWAY FROM BODY WITH WIDTH OF 2 BY DISTANCE OF 1 | 0 | 1 | 1 | 1 | 1 | 0 | 0 | 0 | 0 | 0 | 0 | 1 | 1 | 0 | 0 | 0 | 0 | 0 | d | 1 |
| 12th DETECTION PATTERN | BODY PIXEL INSIDE BODY WITH WIDTH OF 2 | 0 | 0 | 1 | 1 | 1 | 1 | 0 | 0 | 0 | 0 | 0 | 0 | 1 | 1 | 0 | 0 | 0 | 0 | N/A | N/A |
| 13th DETECTION PATTERN | NON-BODY PIXEL AWAY FROM BODY WITH WIDTH OF 1 OR MORE BY DISTANCE OF 4 | 1 | 1 | 1 | 1 | 1 | 0 | 0 | 0 | 0 | 1 | 0 | 0 | 0 | 0 | 0 | 0 | 0 | 0 | a | 4 |
| 14th DETECTION PATTERN | NON-BODY PIXEL AWAY FROM BODY WITH WIDTH OF 1 BY DISTANCE OF 3 | 1 | 1 | 1 | 1 | 1 | 0 | 0 | 0 | 0 | 0 | 1 | 0 | 0 | 0 | 0 | 0 | 0 | 0 | b | 3 |
| 15th DETECTION PATTERN | NON-BODY PIXEL AWAY FROM BODY WITH WIDTH OF 1 BY DISTANCE OF 2 | 0 | 1 | 1 | 1 | 1 | 0 | 0 | 0 | 0 | 0 | 0 | 1 | 0 | 0 | 0 | 0 | 0 | 0 | c | 2 |
| 16th DETECTION PATTERN | NON-BODY PIXEL AWAY FROM BODY WITH WIDTH OF 1 BY DISTANCE OF 1 | 0 | 0 | 1 | 1 | 1 | 0 | 0 | 0 | 0 | 0 | 0 | 0 | 1 | 0 | 0 | 0 | 0 | 0 | d | 1 |
| 17th DETECTION PATTERN | BODY PIXEL INSIDE BODY WITH WIDTH OF 1 | 0 | 0 | 0 | 1 | 1 | 1 | 0 | 0 | 0 | 0 | 0 | 0 | 0 | 1 | 0 | 0 | 0 | 0 | N/A | N/A |
| 18th DETECTION PATTERN | N/A: NON-BODY PIXEL WITH NO BODY REGION NEARBY | 0 | 0 | 0 | 0 | 0 | 0 | 0 | 0 | 0 | 0 | 0 | 0 | 0 | 0 | 0 | 0 | 0 | 0 | N/A | N/A |

FIG.11A
| | | | | | | | | |
|---|---|---|---|---|---|---|---|---|
| 80 | 80 | 10 | 10 | 10 | 10 | 50 | 50 | 10 |
| 80 | 80 | 10 | 10 | 10 | 10 | 50 | 50 | 10 |
| 80 | 80 | 10 | 10 | 10 | 10 | 50 | 50 | 10 |
| 10 | 80 | 80 | 10 | 10 | 10 | 10 | 50 | 50 |
| 10 | 80 | 80 | 10 | 10 | 10 | 10 | 50 | 50 |
| 10 | 80 | 80 | 10 | 10 | 10 | 10 | 50 | 50 |
| 10 | 10 | 80 | 80 | 10 | 10 | 10 | 10 | 50 |
| 10 | 10 | 80 | 80 | 10 | 10 | 10 | 10 | 50 |
| 10 | 10 | 80 | 80 | 10 | 10 | 10 | 10 | 50 |
FIG.11B
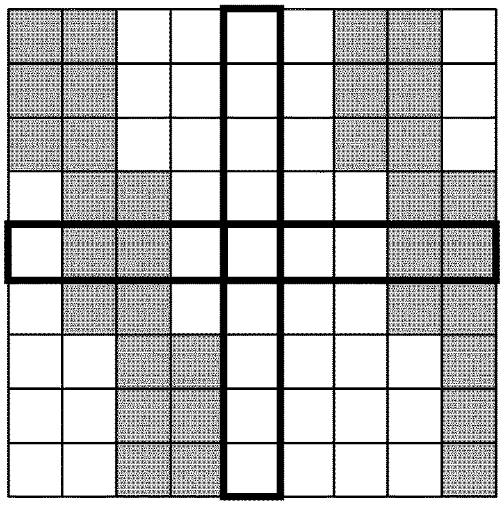
FIG.11C
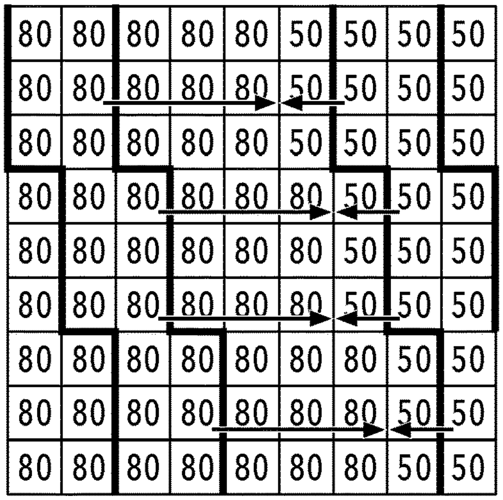

FIG.13A
| | | | | | | | | |
|---|---|---|---|---|---|---|---|---|
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
| 10 | 10 | 10 | 80 | 50 | 10 | 10 | 10 | 10 |
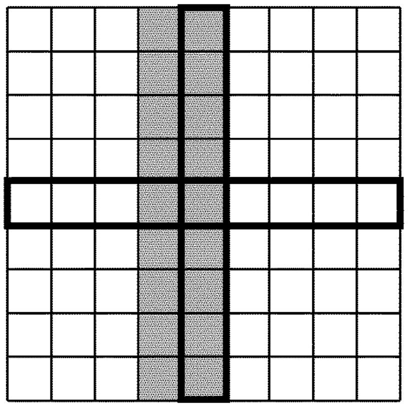
FIG.13B
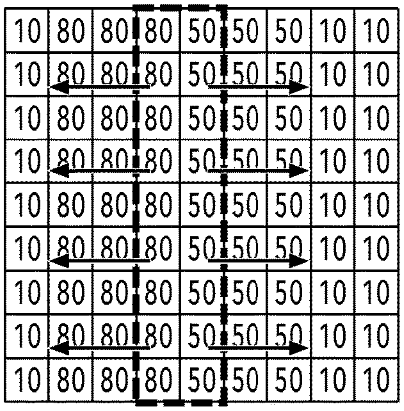
FIG.13C
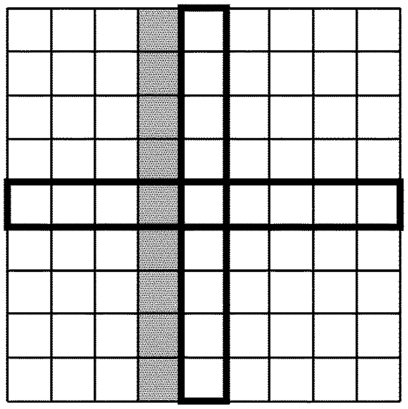
FIG.13D
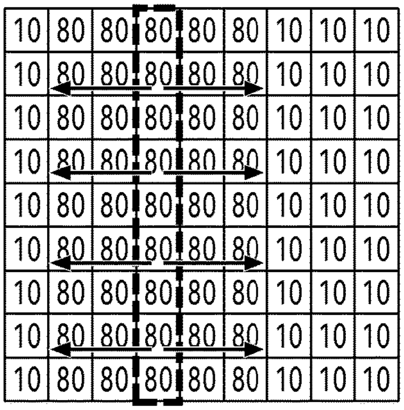
FIG.13E
| | | | | | | | | |
|---|---|---|---|---|---|---|---|---|
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
| 10 | 80 | 80 | 80 | 80 | 80 | 50 | 10 | 10 |
FIG.13F

| | | MASK VALUE | | | | | DETERMINATION VALUE | | | | | REPLACEMENT REFERENCE PIXEL | DISTANCE FROM REFERENCE PIXEL |
|---|---|---|---|---|---|---|---|---|---|---|---|---|---|
| | | a | b | c | d | e | a | b | c | d | e | | |
| 1st DETECTION PATTERN | NON-BODY PIXEL AWAY FROM BODY 2 WITH WIDTH OF 2 OR MORE BY DISTANCE OF 1 | 11 | 11 | 11 | 00 | 00 | 10 | 10 | 00 | 00 | 00 | b | 1 |
| 2nd DETECTION PATTERN | BODY 1 PIXEL AWAY FROM BODY 2 WITH WIDTH OF 2 OR MORE BY DISTANCE OF 1 | 11 | 11 | 11 | 00 | 00 | 10 | 10 | 01 | 00 | 00 | b | 1 |
| 3rd DETECTION PATTERN | BODY 2 PIXEL INSIDE BODY 2 WITH WIDTH OF 2 | 11 | 11 | 11 | 11 | 00 | 00 | 10 | 10 | 00 | 00 | N/A | N/A |
| 4th DETECTION PATTERN | NON-BODY PIXEL AWAY FROM BODY 2 WITH WIDTH OF 1 OR MORE BY DISTANCE OF 2 | 11 | 11 | 11 | 00 | 00 | 10 | 00 | 00 | 00 | 00 | a | 2 |
| 5th DETECTION PATTERN | NON-BODY PIXEL AWAY FROM BODY 2 WITH WIDTH OF 1 BY DISTANCE OF 1 | 11 | 11 | 11 | 00 | 00 | 00 | 10 | 00 | 00 | 00 | b | 1 |
| 6th DETECTION PATTERN | BODY 1 PIXEL AWAY FROM BODY 2 WITH WIDTH OF 1 BY DISTANCE OF 1 | 11 | 11 | 11 | 00 | 00 | 00 | 10 | 01 | 00 | 00 | b | 1 |
| 7th DETECTION PATTERN | BODY 2 PIXEL INSIDE BODY 2 WITH WIDTH OF 1 | 00 | 11 | 11 | 11 | 00 | 00 | 00 | 10 | 00 | 00 | N/A | N/A |
| 8th DETECTION PATTERN | NON-BODY PIXEL AWAY FROM BODY 1 WITH WIDTH OF 2 OR MORE BY DISTANCE OF 1 | 11 | 11 | 11 | 00 | 00 | 01 | 01 | 00 | 00 | 00 | b | 1 |
| 9th DETECTION PATTERN | BODY 1 PIXEL INSIDE BODY 1 WITH WIDTH OF 2 | 11 | 11 | 11 | 11 | 00 | 00 | 01 | 01 | 00 | 00 | N/A | N/A |
| 10th DETECTION PATTERN | NON-BODY PIXEL AWAY FROM BODY 1 WITH WIDTH OF 1 OR MORE BY DISTANCE OF 2 | 11 | 11 | 11 | 00 | 00 | 01 | 00 | 00 | 00 | 00 | a | 2 |
| 11th DETECTION PATTERN | NON-BODY PIXEL AWAY FROM BODY 1 WITH WIDTH OF 1 BY DISTANCE OF 1 | 11 | 11 | 11 | 00 | 00 | 00 | 01 | 00 | 00 | 00 | d | 1 |
| 12th DETECTION PATTERN | BODY 1 PIXEL INSIDE BODY 1 WITH WIDTH OF 1 | 00 | 11 | 11 | 11 | 00 | 00 | 00 | 01 | 00 | 00 | N/A | N/A |
| 13th DETECTION PATTERN | N/A: NON-BODY PIXEL WITH NO BODY REGION NEARBY | 00 | 00 | 00 | 00 | 00 | 00 | 00 | 00 | 00 | 00 | N/A | N/A |

FIG.14

PRINTING APPARATUS, METHOD FOR CONTROLLING PRINTING APPARATUS, AND STORAGE MEDIUM

BACKGROUND

Field

The present disclosure relates to a printing apparatus, a method for controlling the printing apparatus, and a program.

Description of the Related Art

Inkjet printing apparatuses that print an image on a printing medium by ejecting an ink from a printhead to the printing medium are known. In recent years, such inkjet printing apparatuses have been used to output printed products for various purposes, and accordingly, various kinds of ink suited for the various purposes have come to be used in the inkjet printing apparatuses.

In the event where an inkjet printing apparatus prints an image, color ink droplets applied onto a printing medium may come into contact with each other and pull each other, which may cause bleeding between the color ink droplets, leading to lower image quality. Using a reaction liquid ink that reacts with a color material contained in a color ink is effective in reducing the occurrence of bleeding. A contact between a color ink and a reaction liquid link on a printing medium causes flocculation and the like of a color material contained in the color ink and therefore helps reduce the occurrence of bleeding.

However, in a case where a reaction liquid ink is applied more than a necessary amount for flocculating a color material, the color material is overly flocculated, which may lower the glossiness on the resultant printed product. It is therefore necessary that the application amount of the reaction liquid ink be set properly. For example, the application amount of the reaction liquid ink is set based on the application amount of a color ink.

In such a case, should the landing position of at least one of the color ink and the reaction liquid be displaced, there is a possibility that the reaction liquid is applied in an amount smaller than a preset amount. Bleeding may then occur in a region where such application was done, leading to lower image quality.

Japanese Patent Laid-Open No. 2006-346931 discloses a technique for reducing occurrence of bleeding by applying a larger amount of reaction liquid at a border between an image region and a non-image region (paper white). More specifically, at such a border, a color ink droplet and a reaction liquid ink droplet are ejected so that the amount of the color ink droplet may be smaller than the amount of the reaction liquid ink droplet or the dot size of the color ink droplet may be smaller than the dot size of the reaction liquid ink droplet.

SUMMARY

However, Japanese Patent Laid-Open No. 2006-346931 cannot solve the problem of bleeding which may occur at a border between a plurality of image regions where the density of the color ink is different from each other.

Thus, the present disclosure aims to reduce bleeding which may occur near a border between a plurality of image regions where the density of color ink is different from each other.

Further features of the present invention will become apparent from the following description of exemplary embodiments with reference to the attached drawings.

BRIEF DESCRIPTION OF THE DRAWINGS

FIG. 10 is a diagram showing detection patterns used in the pattern matching processing;

FIGS. 11A to 11C are diagrams illustrating pattern matching processing and bolding processing on a region sandwiched between two regions with large reaction liquid application amounts;

FIGS. 13A to 13F are diagrams illustrating processing performed in a case where the reaction liquid application amounts are represented with three values; and FIG. 14 is a diagram showing detection patterns in a case where the pattern matching processing is performed with three values.

DESCRIPTION OF THE EMBODIMENTS

First Embodiment

An embodiment of the present invention is described below with reference to the drawings. The following description takes a printing apparatus employing the inkjet printing method as an example. The printing apparatus may be, for example, a single-function printer having only a printer function or a multi-function printer having a plurality of functions such as, for example, a printer function, a FAX function, and a scanner function. It may also be a manufacturing apparatus for manufacturing, for example, color filters, electronic devices, optical devices, minute structures, or the like using a predetermined printing method.

<Configuration of an Inkjet Printing Apparatus>

Figure 1:
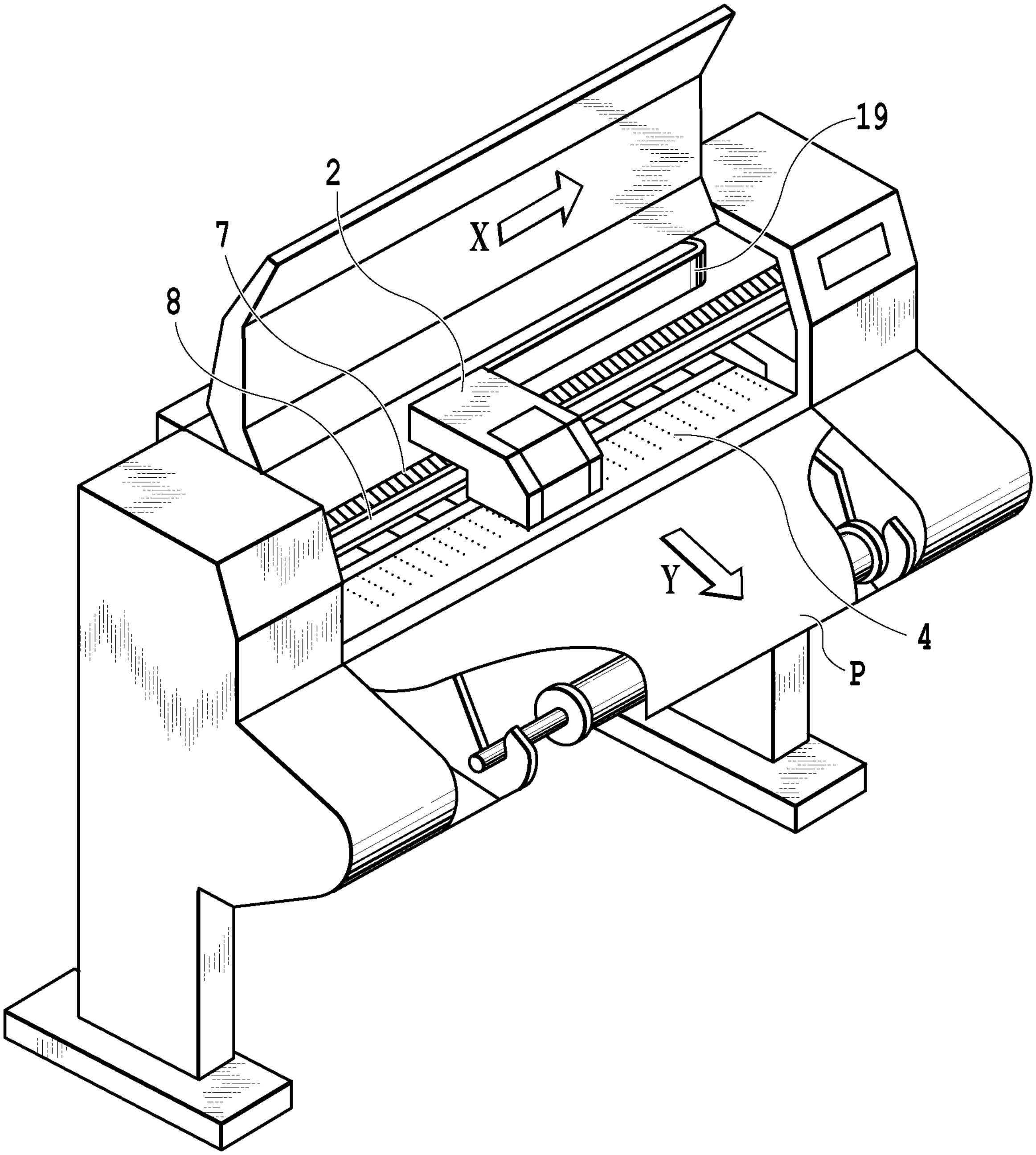
FIG. 1 is a perspective view of a printing apparatus.

FIG. 1 shows an external view of an inkjet printing apparatus (herein, referred to simply as a printing apparatus, a printer, or the like) according to the present embodiment. This is what is called a serial-scan printer, and prints an image on a printing medium P by scanning a printhead in an X-direction (a scan direction) orthogonal to a Y-direction (a conveyance direction).

An overview of the configuration of the inkjet printing apparatus and the operation thereof during printing is described using FIG. 1. First, by a conveyance roller driven by a conveyance motor (not shown) via gears, the printing medium P is conveyed in the Y-direction from a spool 12 (see FIG. 2) holding the printing medium P.

Meanwhile, with the printing medium P conveyed being at a predetermined position, a carriage unit 2 is scanned in a reciprocating manner (moved in a reciprocating manner) by a carriage motor (not shown) along a guide shaft 8 extending in the X-direction. Then, in this scanning step, inks are ejected from ejection ports of a printhead (to be described later) attachable to the carriage unit 2 at a timing based on a position signal obtained by an encoder 7 to execute printing on a certain band width corresponding to the length of arrays of the ejection ports. The scanning speed of the carriage unit 2 is variable, and the carriage unit 2 can scan 10 to 70 inches per second. The printing resolution is also variable, and the ejection operation can be performed at 300 to 2400 dpi. In the configuration in this example, the carriage unit 2 scans at a scanning speed of 40 inches per second, and the ejection operation is performed at a printing resolution of 1200 dpi (at the intervals of 1/1200 inches). After that, the printing medium Pis conveyed, and the printing is performed on the next band width. Although details will be given later, a printing element for ejecting ink as a droplet is provided inside each of the ejection ports at the printhead attachable to the carriage unit 2. A flexible wiring board 19 is provided to supply drive pulses for driving the printing elements, head temperature adjustment signals, and the like.

Note that a carriage belt can be used to transmit driving power from the carriage motor to the carriage unit 2. However, in place of the carriage belt, a different driving means can be used, such as, for example, one having a lead screw that is driven and rotated by the carriage motor and extends in the X-direction and an engagement portion that is provided at the carriage unit 2 and engages with a groove in the lead screw.

The printing medium P which has been fed is sandwiched and conveyed between a paper feed roller and a pinch roller and is led to a print position (the printhead's scan region) on a platen 4. While the printing apparatus is in normal standby mode, the face surface of the printhead is capped. Thus, the printhead is decapped before printing to bring the printhead and the carriage unit 2 to a scannable state. After that, once data for one scan is accumulated in a buffer, the carriage unit 2 is scanned by the carriage motor to perform printing as described above.

Figure 2:
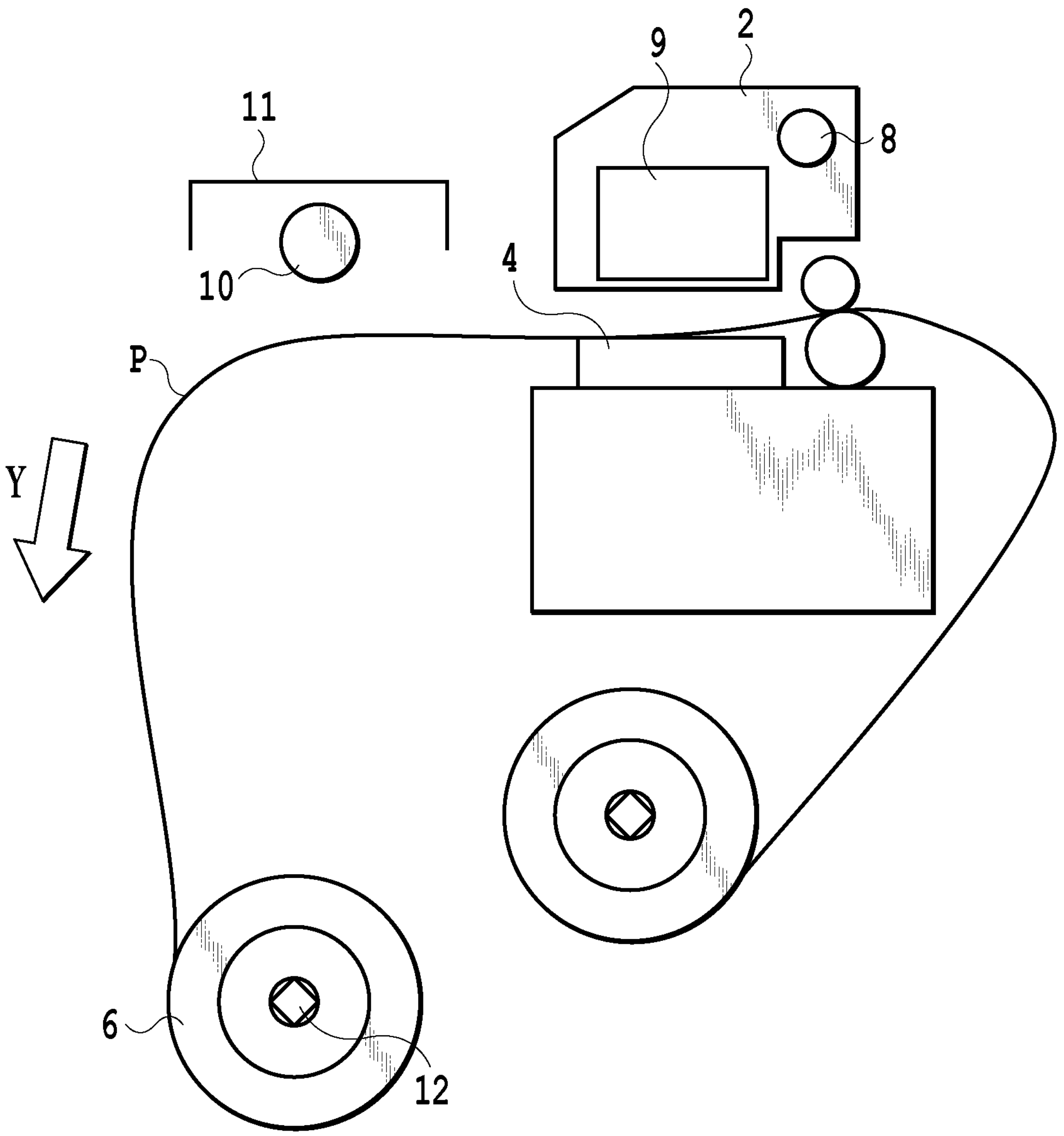
FIG. 2 is a side sectional view of the printing apparatus.

FIG. 2 is a side sectional view of the main body of the printing apparatus and is a schematic view of an area around a heating unit. Although not shown in FIG. 1, a heating unit is provided in the printing apparatus to heat and dry the ink applied to the printing medium P by a printing operation. This heating unit has not only the function of drying the ink, but also the function of heating water-soluble resin particles to be described later to allow them to form a film. The water-soluble resin particles are resin that forms a film by being heated after being applied to a printing medium to improve the abrasion resistance of the image.

A heater 10 is disposed at a curing region, supported by a frame (not shown). The curing region is located downstream, in the sub scanning direction (the Y-direction), of the location where the printhead 9 attached to the carriage unit 2 scans in the main scanning direction X in a reciprocating manner. The heater 10 dries liquid-form ink on the printing medium P by applying heat. The heater 10 is covered by a heater cover 11, and the heater cover 11 serves the function of efficiently radiating the printing medium P with the heat from the heater 10 and the function of protecting the heater 10. Note that the "heating unit" herein refers to a part including the heater 10 and the heater cover 11.

The printing medium P is, after being printed by the printhead 9, reeled by the spool 12 and forms a roll of reeled medium 6. Specific examples of the heater 10 include a sheathed heater and a halogen heater, but other heaters may also be used.

In the printing method of the present embodiment, the heating temperature for the heating unit at the curing region described above is desirably equal to or above a minimum temperature for the water-soluble resin particles to form a film. Also, because a majority of the liquid component, such as a water-soluble organic solvent, in an ink needs to be evaporated during heating, the heating unit is preferably configured to allow enough heating time in order to supply energy necessary for a majority of the liquid component to evaporate. Thus, the heating unit needs to be designed considering the film formability, evaporation of the liquid component, productivity of printed products, and the heat resistance of the printing medium P.

Note that as the means for the heating unit to heat the curing region, heating from above by warm air blowing, heating from below the printing medium using a contact-type heat-conduction-type heater, or the like may be used. Although the means for the heating unit to heat the curing region is located at one location in the present example (FIG. 2), it may be located at two or more locations and used together as long as the temperature measured by a radiation thermometer (not shown) above the printing medium P does not exceed the set value for the heating temperature.

<Configuration of the Printhead>

Figure 3:
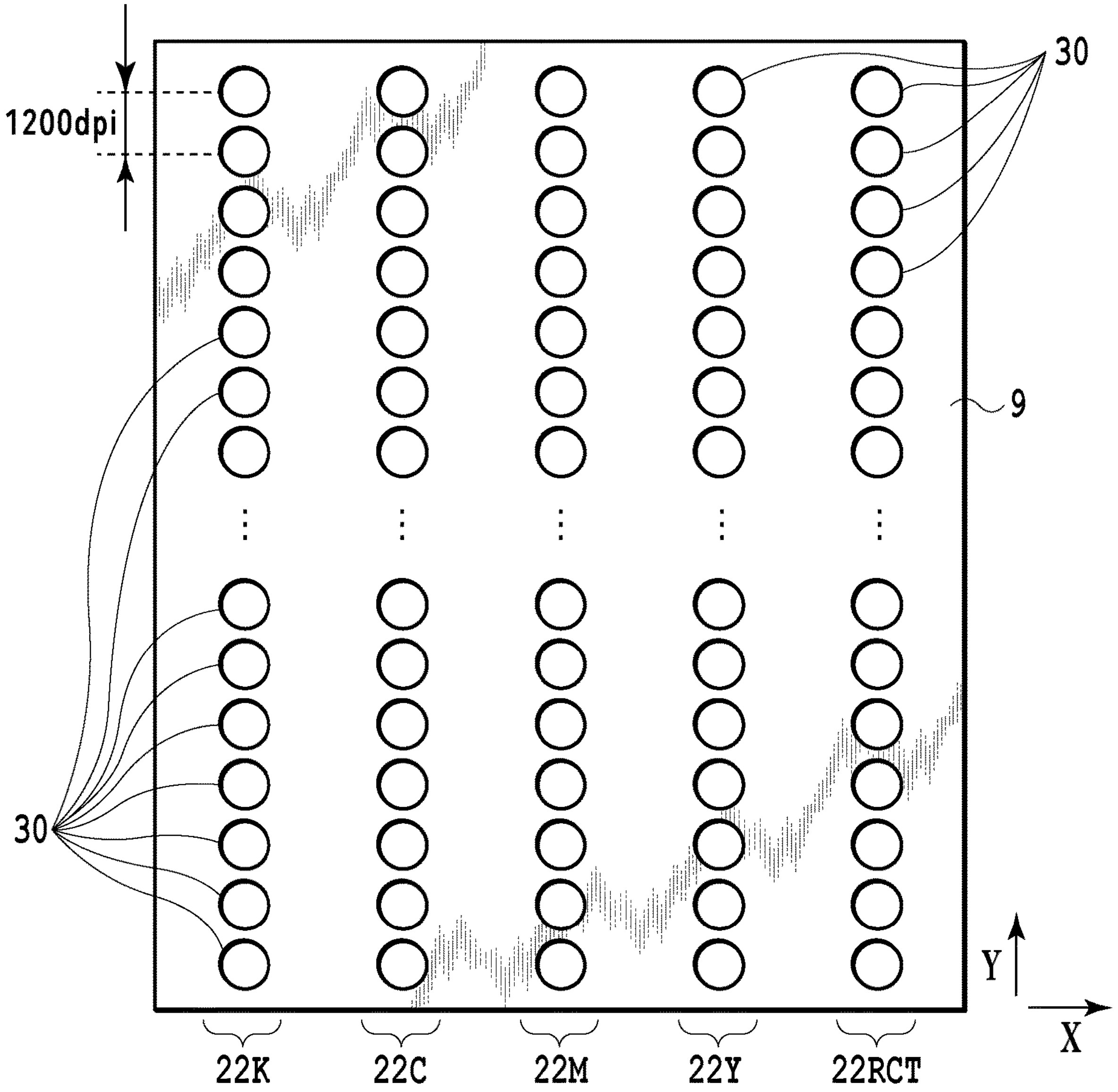
FIG. 3 a schematic view of a printhead seen from the ejection port side.

FIG. 3 shows the printhead 9 according to the present embodiment. The printhead 9 includes a plurality of ejection port arrays each being an array of a plurality of ejection ports for ejecting an ink containing a color material. Specifically, the printhead 9 includes an ejection port array 22K for ejecting a black ink (K), an ejection port array 22C for ejecting a cyan ink (C), an ejection port array 22M for ejecting a magenta ink (M), and an ejection port array 22Y for ejecting a yellow ink (Y). The black ink (K), the cyan ink (C), the magenta ink (M), and the yellow ink (Y) each contain a color material. For simplicity, the following description refers to these inks containing color materials (CMYK inks) as color inks as well.

The printhead 9 also includes an ejection port array 22RCT for ejecting a reaction liquid ink (RCT) containing no color material. This reaction liquid ink (hereinafter referred to as a reaction liquid for simplicity) contains no color material, but contains a reactive component that reacts with the color materials contained in the color inks. The reaction liquid comes into contact with the color inks on a printing medium, and the component of the reaction liquid causes flocculation of the color materials in the color inks. This helps reduce occurrence of bleeding.

On the printhead 9, the ejection port arrays 22K, 22C, 22M, 22Y, and 22RCT are arranged side by side in this order from the left side to the right side in the X-direction. These ejection port arrays 22K, 22C, 22M, 22Y, and 22RCT each have 1280 ejection ports 30 arranged in the Y-direction (the array direction) at a density of 1200 dpi and configured to eject a corresponding ink. Note that in the present example, the amount of ink ejected from a single ejection port 30 at once is approximately 4.5 pl.

These ejection port arrays 22K, 22C, 22M, 22Y, and 22RCT are connected to respective ink tanks (not shown) that retain corresponding inks and are supplied with inks from the corresponding ink tanks. Note that the ink tanks may be configured integrally with the printhead 9 or may be configured separably.

Note that the specific compositions of the black ink (K), the cyan ink (C), the magenta ink (M), the yellow ink (Y), and the reaction liquid (RCT) will be described later. Also, the water-soluble resin particles that form a film by being heated and thereby improve the abrasion resistance of a printed product may be contained in each of the color inks described above. Also, as a third ink different from the color inks or the reaction liquid, a clear emulsion ink (Em) containing no color material but containing water-soluble resin particles may be used. In this case, the printhead 9 includes an ejection port array 22Em for ejecting the clear emulsion ink.

<Compositions of the Inks>

The following describes details of inks constituting an ink set used in the present embodiment. Note that "parts" and "%" used below are based on the mass unless otherwise noted.

<<Compositions of the Color Inks>>

The following describes the compositions of the color inks in detail.

The color inks (C, M, Y, K) and the reaction liquid (RCT) used in the present embodiment all contain a water-soluble organic solvent. The water-soluble organic solvent preferably has a boiling point of 150° C. or above and 300° C. or below from the perspective of wettability and moisture retainability of the face surface of the printhead 9. From the perspective of a function as a film formation aid for resin particles and its swellability and solubility with respect to a printing medium having a resin layer formed thereon, it is particularly preferable that the water-soluble organic solvent be a ketone compound such as acetone or cyclohexanone or a propylene glycol derivative such as tetraethyleneglycol dimethyl ether. From the same perspective, also particularly preferable is, e.g., a heterocyclic compound having a lactam structure, typified by N-methylpyrrolidone and 2-pyrrolidone.

From the perspective of ejection performance, a content of the water-soluble organic solvent is preferably 3 wt % or above and 30 wt % or below. Specific examples of the water-soluble organic solvent include alkyl alcohols with one to four carbons, such as methyl alcohol, ethyl alcohol, n-propyl alcohol, isopropyl alcohol, n-butyl alcohol, sec-butyl alcohol, and tert-butyl alcohol, amides such as dimethylformamide and dimethyl acetamide, ketones or ketoalcohols such as acetone and diacetone alcohol, ethers such as tetrahydrofuran and dioxane, polyalkylene glycols such as polyethylene glycol and polypropylene glycol, ethylene glycol, or alkylene glycols with an alkylene group with two to six carbon atoms, such as propylene glycol, butylene glycol, triethylene glycol, 1,2,6-hexanetriol, thiodiglycol, hexylene glycol, and diethylene glycol, lower alkyl ether acetate such as polyethylene glycol monomethylether acetate, glycerine, polyalcohol lower alkyl ethers such as ethylene glycol monomethyl (or monoethyl) ether, diethylene glycol methyl (or ethyl) ether, and triethylene glycol monomethyl (or monoethyl) ether, polyalcohols such as trimethylolpropane and trimethylolethane, N-methyl-2-pyrrolidone, 2-pyrrolidone, and 1,3-dimethyl-2-imidazolidinone. The water-soluble organic solvents described above may be used solely or as a mixture.

Also, deionized water is desirably used as water. A content of the water-soluble organic solvent in the reaction liquid ink (RCT) is not limited to a particular content. Meanwhile, the color inks (C, M, Y, K) may contain a surfactant, an antifoam, an antiseptic, an antifungal, and/or the like in addition to the above components as needed in order to have a desired physical property value as needed.

Also, the color inks (C, M, Y, K) and the reaction liquid ink (RCT) used in the present embodiment all contain a surfactant. The surfactant is used as a penetrant for the purpose of improving the penetrability of ink into an inkjet printing medium. The more the surfactant is added, the stronger the property of reducing the surface tension of ink will be, and the wettability and penetrability of the ink relative to the printing medium improve. In the present embodiment, a small amount of acetylene glycol EO adduct or the like is added as the surfactant to make adjustments so that the surface tensions of the inks may be 30 dyn/cm or below and that the difference in surface tension between the inks may be 2 dyn/cm or below. More specifically, all the inks equally have a surface tension of approximately 22 to 24 dyn/cm. The fully automatic surface tensiometer CBVP-Z (manufactured by Kyowa Interface Science Co., Ltd.) was used to measure the surface tension. The measuring device is not limited to the above example as long as the surface tension of ink can be measured.

Also, the pHs of the inks in the present embodiment are all stable on the alkaline side, and the values are 8.5 or above and 9.5 or below. It is preferable that the pH of each ink be 7.0 or above and 10.0 or below from the perspective of preventing, e.g., elution and degradation of an ink-contacting member in the printing apparatus or in the printhead and reduction of the solubility of dispersed resin in the ink. For the pH measurement, the pH meter F-52 manufactured by HORIBA, Ltd. was used. Note that the measuring device is not limited to the above example as long as the pH of ink can be measured.

Also, a white ink (W) or a metallic ink (Mt) may be further included as a color ink.

Composition of the Reaction Liquid

In order to overcome the problems on an image such as bleeding and beading, the present embodiment employs a system that performs printing using a reaction liquid to insolubilize part or all of solid components in the color inks.

Examples of the reaction liquid include a solution containing polyvalent metal ions (such as, for example, magnesium nitrate, magnesium chloride, aluminum sulfate, or iron chloride) in order to insolubilize dissolved dye or dispersed pigment and resins. As a kind of flocculation action using cations, a system used by a low-molecular-weight cationic polymer flocculant can also be used with the aim of neutralizing the charges of water-soluble resin particles and insolubilizing anionic soluble substances.

As a different reaction system, there is an insolubilization system using a reaction liquid utilizing a pH difference. As mentioned earlier, most of typical color inks used for inkjet printing are stable on the alkaline side due to, e.g., the properties of the color materials therein. Specifically, they typically have a pH of approximately 7 to 10, and the pH is often set around mainly 8.5 to 9.5 from an industrial perspective and also considering, e.g., the influence of external environments. In order to flocculate and solidify a color ink of such a system, an acidic solution may be mixed in to change the pH and to thereby destroy the stable state and flocculate dispersed components. With the aim of such action, a solution exhibiting acidity can be used as a reaction liquid as well.

<<Water-Soluble Resin Particles>>

The color inks in the present embodiment contain water-soluble resin particles for improving the abrasion resistance (fixation) of a printed image by bringing the color materials into close contact with a printing medium. Resin particles are melted by heat, and formation of a film of the resin particles and drying of a solvent contained in the inks are performed by the heater. "Resin particles" in the present embodiment mean polymer particles existing in water in a dispersed state.

Specific examples include acrylic resin particles obtained by synthesis of, e.g., alkyl (meth)acrylate ester monomers and alkyl (meth)acrylate amide monomers through emulsion polymerization or the like, styrene-acryl resin particles obtained by synthesis of styrene monomers with, e.g., alkyl (meth)acrylate ester monomers and alkyl (meth)acrylate amide monomers through emulsion polymerization or the like, polyethylene resin particles, polypropylene resin particles, polyurethane resin particles, and styrene-butadiene resin particles. The resin particles may be core-shell resin particles, in which the core part and the shell part forming a resin particle have different polymer compositions from each other, or resin particles obtained by having pre-synthesized acrylic particles as seed particles and performing emulsion polymerization around the seed particles in order to control particle size. Further, the resin particles may be hybrid resin particles obtained by chemically combining different kinds of resin particles such as acrylic resin particles and urethane resin particles.

Note that the water-soluble resin particles do not necessarily need to be contained in a color ink, and may be contained in the clear emulsion ink (Em) as a third ink different from the color inks or the reaction liquid and containing no color material.

<<Printing Medium>>

The printing apparatus of the present embodiment performs printing on a low-permeability printing medium into which moisture is difficult to penetrate. A low-permeability printing medium is, as described earlier, a medium which absorbs no or extremely little moisture. Thus, with an aqueous ink containing no organic solvent, the ink will be repelled, and an image cannot be formed. Meanwhile, a low-permeability printing medium has excellent resistance to water and weather and is therefore suitable to be used for a printed product for outdoor use. Usually, a printing medium with a contact angle of 45° or above or preferably 60° or above to water at 25° C. is used.

Examples of the low-permeability printing medium include a printing medium having a plastic layer formed as an outermost surface of a base material, a printing medium having no ink receiving layer formed on a base material, and a sheet, film, or banner made of glass, yupo paper, plastic, or the like. Examples of a plastic coating described above include vinyl chloride, polyethylene terephthalate, polycarbonate, polystyrene, polyurethane, polyethylene, and polypropylene. Having excellent resistance to water, light, and abrasion, these low-permeability printing media are generally used to print a printed product for outdoor display.

As an example of a method for evaluating the permeability of a printing medium, the publicly-known Bristow's method can be used. In the Bristow's method, a predetermined amount of ink is poured into a storage container having an opening slit of a predetermined size. Then, it is brought into contact, through the slit, with a printing medium processed into a strip shape and wound around a disk. Then, the disk is rotated with the storage container fixed in position, and the area (length) of an ink strip transferred to the printing medium is measured. Based on this area of the ink strip, a transfer amount ($ml \cdot m^{-2}$) per second per unit area can be calculated. In the present embodiment, a printing medium is regarded as a low-permeability printing medium in a case where its ink transfer amount (absorption amount) measured with the Bristow's method at 30 msec is smaller than 10 ($ml \cdot m^{-2}$).

<Configuration of the Control System of the Printing Apparatus>

Figure 4:
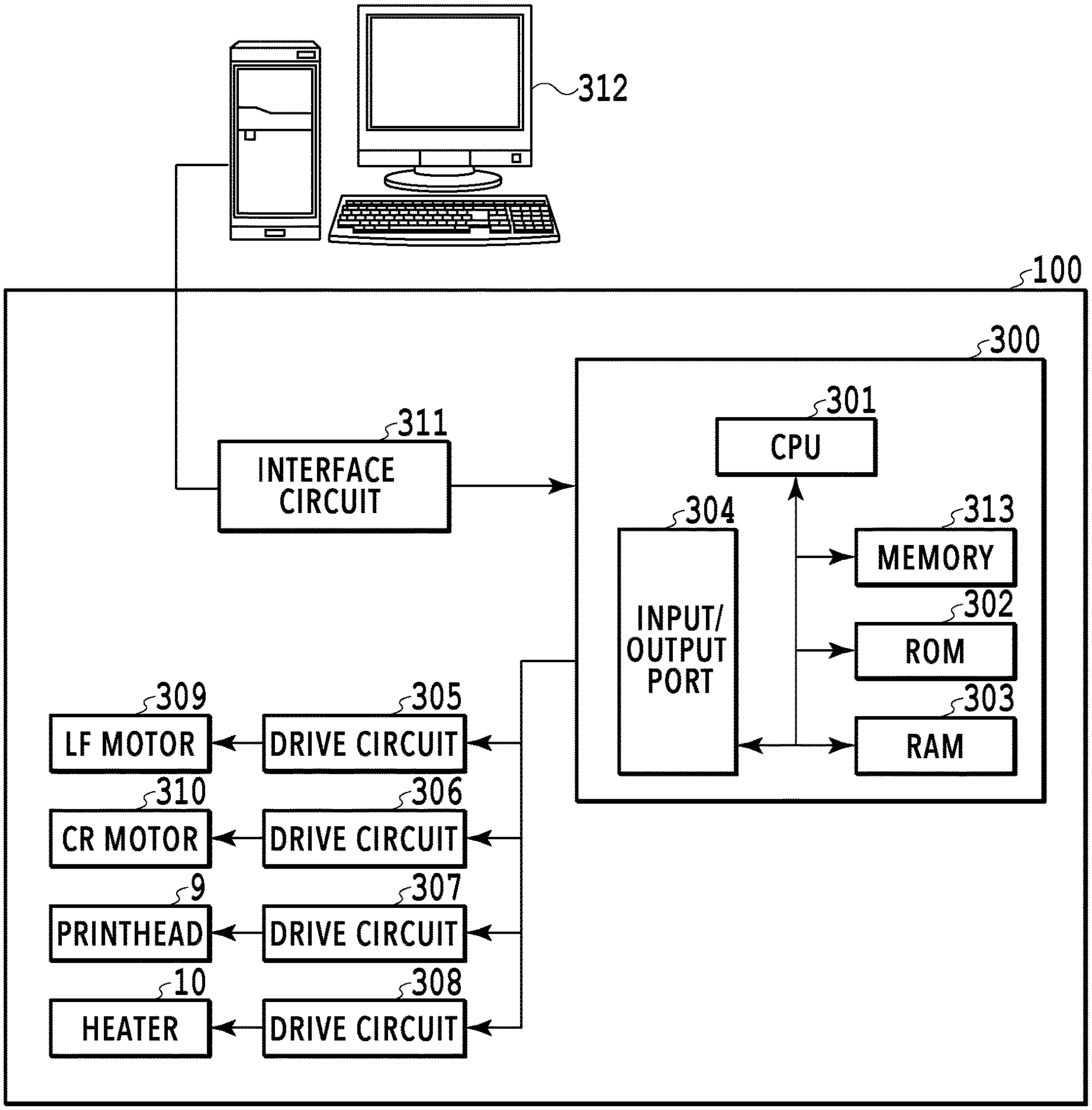
FIG. 4 is a block diagram showing a control system of the printing apparatus.

FIG. 4 is a block diagram showing a schematic configuration of the control system in the inkjet printing apparatus 100 of the present embodiment. A main control unit 300 includes a CPU 301, a ROM 302 that stores, e.g., control programs to be executed by the CPU 301, a RAM 303 used as, e.g., a buffer for print data, an input/output port 304, a memory 313, and the like. The CPU 301 executes a printing operation and processing operations such as computation, selection, discrimination, and control. Mask patterns to be described later and the like are stored in the memory 313. Connected to the input/output port 304 are drive circuits 305, 306, 307, 308 for, e.g., actuators for a conveyance motor (LF motor) 309, a carriage motor (CR motor) 310, the printhead 9, the heater 10, and a cutting unit. Further, the main control unit 300 is connected to a PC 312, which is a host apparatus, via an interface circuit 311. Although a PC is used as a host apparatus in FIG. 4, it is to be noted that the present disclosure is not limited to this. As a host apparatus, any information processing apparatus such as a smartphone may be used in the present embodiment.

<Image Data Conversion Processing>

Figure 5:
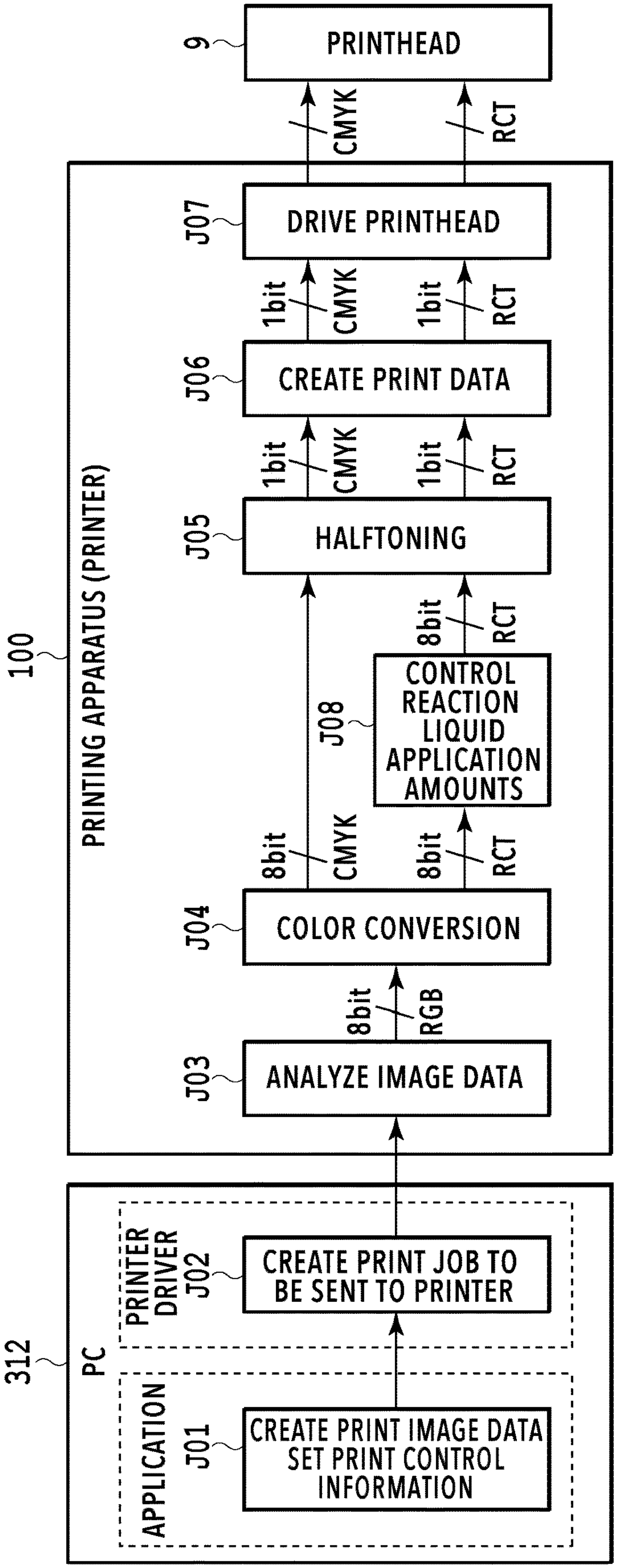
FIG. 5 is a diagram showing a process of data processing.

FIG. 5 is a flowchart illustrating a process of image data conversion processing (referred to as image (data) conversion processing, image processing, or the like). The image processing in the printing system of the present embodiment is executed by the PC 312 and the printing apparatus 100, and this image processing is image data conversion processing to create, from image data inputted, data indicating the positions of ink dots formed by each print scan. This image processing has a series of processes, each of which is executed by either the PC 312 or the printing apparatus 100. Note that some of the processes of the processing may be shared and executed by both.

In the PC 312, an application program (not shown) and a printer driver (not shown) for the printing apparatus 100 are stored. This application executes processing to create print image data to be transmitted to the printer driver, based on information specified by a user via a GUI screen displayed on a display unit (a monitor) of the PC 312 and processing to set print control information for controlling printing. Note that in FIG. 5, the processing to create the print image data and the processing to set the print control information are shown collectively as processing J01.

The print image data created by the application and the print control information set by the application are sent to a printer driver module installed in the PC 312 in the event where the printing apparatus 100 performs printing thereof. The printer driver module then executes print job creation processing J02 based on the print image data and the print control information. Then, the printer driver module transmits the created print job to the printing apparatus 100 via the interface circuit 311. The main control unit 300 of the printing apparatus 100 receives the print job containing data on a series of print commands (print command data) and temporarily stores the received print job in the RAM 303 which is a work memory. The print command data contains not only image data but also information indicating, e.g., the size of the image data and a printing mode for printing the image data, and the image processing described below is executed based on results of analysis of these pieces of information.

A program for executing the processing below is stored in the memory 313 built in the main control unit 300 of the printing apparatus 100 and is executed by the CPU 301.

The CPU 301 of the printing apparatus 100 performs image data analysis processing J03 shown in FIG. 5. The present embodiment assumes that input image data which is data before undergoing the image data analysis processing J03 is raster image data and is multi-valued data of three channels: R (red), G (green), and B (blue). Image data encoded as data on a series of print commands is subjected to decoding processing in the image data analysis processing J03.

Color conversion processing J04 executed after the image data analysis processing J03 is processing to convert the input print data into image data formed by color signals for the inks used in the printing apparatus 100. For example, the input print data contains image data representing an image. In a case where the image data represents the image with coordinates in a color space such as sRGB which is the monitor's color representation, the sRGB color coordinates (R, G, B) are converted into ink color data (C, M, Y, K) for the printing apparatus. This conversion is implemented using a known approach such as matrix operation processing or processing using a three-dimensional lookup table (LUT). Because the printing apparatus 100 of the present embodiment uses black (K), cyan (C), magenta (M), and yellow (Y) inks, image data on RGB signals are converted to multi-valued image data formed by color signals of K, C, M, and Y each being eight-bit long. This image data is color ink application amount data. The value of a color signal of each ink corresponds to the amount of the ink applied. Note that the number of ink colors is not limited to the four colors K, C, M, and Y. In a case where other inks such as inks of light cyan (Lc), light magenta (Lm), and gray (Gy) that are lighter in density are used to improve the image quality of a printed image, color signals corresponding to those are generated. Further, in the color conversion processing J04, data on the application amount of the reaction liquid (RCT) in multi-valued representation is created based on the input image data. The C, M, Y, and K colors are each represented with eight bits, and the reaction liquid (RCT) is represented with eight bits. As to the value in eight bits, i.e., from 0 to 255, 0 means that the color ink application amount or the reaction liquid application amount is 0%, and 255 means that the color ink application amount or the reaction liquid application amount is 100%. Each value in between (2 to 254) indicates a color ink application amount or a reaction liquid application amount that increases in proportion to the value.

Here, the relation between the value of ink color data (C, M, Y, or K) and the value of reaction liquid application amount data (RCT) is described. The value of ink color data (C, M, Y, or K) corresponds to the application amount of the color ink, and the value of reaction liquid application data (RCT) corresponds to the application amount of the reaction liquid. The relation between them is described using FIGS. 6A and 6B.

Figures 6A, 6B:
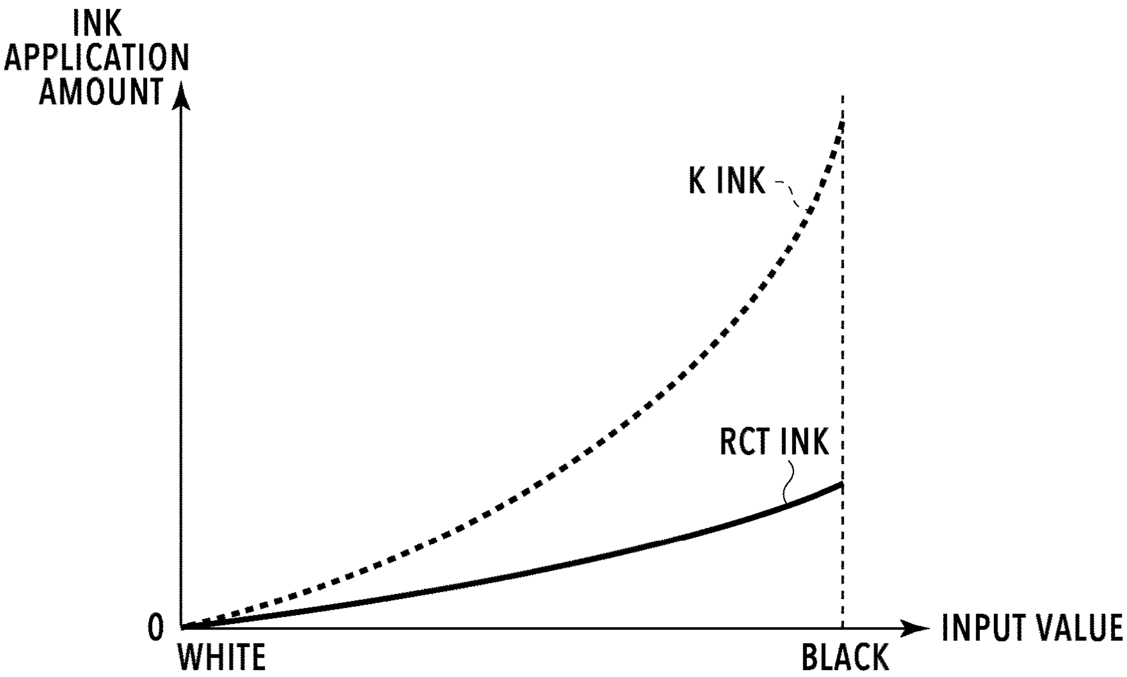
FIGS. 6A and 6B are diagrams illustrating color conversion processing.

FIG. 6A is a diagram showing an example of a lookup table used in the color conversion processing J04. The horizontal axis in FIG. 6A represents a signal value inputted in the color conversion processing J04, and this horizontal axis represents achromatic tones (R=G=B) from white (R=G=B=255) to black (R=G=B=0). Meanwhile, the vertical axis represents a signal value outputted in the color conversion processing J04. In the relation shown, the higher the density of an input image, the larger the application amount of the K ink, and the larger the application of the K ink, the more the reaction liquid is applied. By thus properly increasing the application amount of the reaction liquid in accordance with an increase in the application amount of the K ink to promote an increase in the viscosity of the ink liquid, bleeding is reduced. In FIG. 6B, the left bitmap image represents image data for the K ink, and the right bitmap image represents image data for the RCT ink. These bitmap images show a region having pixels of black (R=G=B=0) and pixels of a light color close to white (R=G=B=240).

Although a case with achromatic tones and with the K ink alone is depicted in FIGS. 6A and 6B, the same applies to a case with chromatic color tones and a secondary or higher-order color using a plurality of inks. The larger the total value of the application amounts of the C ink, the M ink, the Y ink, and the K ink, the more the reaction liquid is applied. This promotes an increase in the viscosity of the ink liquid and reduces bleeding. Such control is implemented using a known method described above, such as matrix operation processing or processing using a three-dimensional lookup table (LUT).

After the color conversion processing J04, reaction liquid application amount control processing J08 is performed on the reaction liquid application amount data (RCT). Note that the reaction liquid application amount control processing J08 will be described later (see FIG. 8).

After the color conversion processing J04, halftoning processing J05 is performed. The halftoning processing J05 is performed on image data represented with the values of color signals obtained by the color conversion processing J04. The halftoning processing J05 is, specifically, processing to decrease the number of levels of tones of the image data, and in the present example, the halftoning processing J05 is performed on each pixel using a dither matrix having an arrangement of thresholds to be compared with a value in image data. As a result of the halftoning processing J05, ultimately, image data is generated in which each pixel is represented by one of two values indicating whether to form an ink dot. Note that in a case where a multi-pass printing method to be described later is employed, image thinning-out processing is performed, using mask patterns and the like, on the data obtained by the halftoning processing to create data on thinned-out images for the respective print scans.

After the halftoning processing J05, print data creation processing J06 is performed. The print data creation processing J06 creates data (referred to as print data) having print control information added to the print image data in which each pixel is represented with one bit. The print data thus created is stored in the RAM 303, which is a work memory. The binary print image data stored in the RAM 303 is sequentially read by the CPU 301 and is inputted to a head drive circuit J07. After being inputted to the head drive circuit J07, the print image data in one-bit representation corresponding to each ink color is converted into drive pulses for the printhead 9.

After the print data creation processing J06, driving processing J07 for the printhead 9 is performed. Specifically, a head drive circuit performs the driving processing J07 and drives the printhead 9 based on the drive pulses obtained by the print data creation processing J06. As a result of this driving processing J07, the inks are ejected at predetermined timing.

Note that the lookup table referred to in the color conversion processing described above and the dither matrix referred to in the halftoning processing are stored in the ROM 302 in advance, and pluralities of them are prepared for various kinds of printing media and printing modes of the printing apparatus 100. Upon receipt of print command data, the main control unit 300 analyzes the print command data, selectively reads a lookup table corresponding to the print commands from the ROM 302, which is a storage region, loads the thus-read lookup table into the RAM 303, which is a work memory, and uses the lookup table.

<Multi-Pass Printing Method>

In the present embodiment, an image is printed using what is called multi-pass printing, in which an image is printed by a plurality of scans for a predetermined region on a printing medium using the inks (C, M, Y, K, and RCT). The following describes a typical multi-pass printing method.

Figure 7:
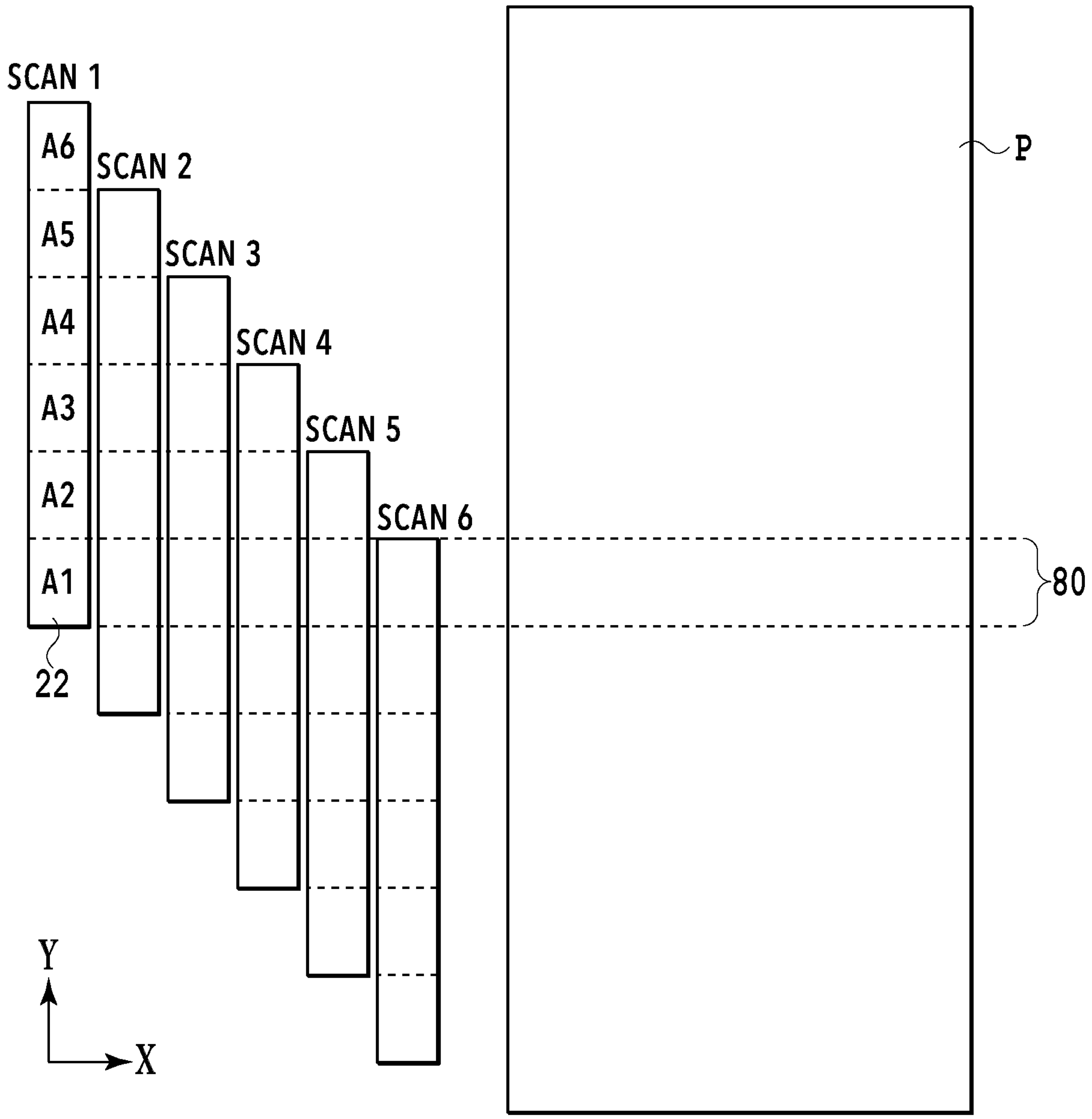
FIG. 7 is a diagram illustrating a multi-pass printing method.

FIG. 7 is a diagram illustrating a typical multi-pass printing method. In this example, inks are ejected from six ejection port groups A1 to A6, obtained by dividing each ejection port array 22 in the Y-direction, i.e., inks are ejected in each of six scans for the predetermined region. Note that in actuality, the printing medium P is conveyed downstream in the Y-direction between scans of the printhead 9, but for ease of illustration, FIG. 7 depicts the method as if the printhead 9 is moved upstream in the Y-direction between scans.

First, in the first scan (Scan 1), the printhead 9 is scanned with a positional relation such that a predetermined region 80 on the printing medium P and the ejection port group A1 in the ejection port array 22 face each other. Meanwhile, inks are ejected from the ejection ports belonging to the ejection port group A1 to the predetermined region 80 based on print data on each type of ink corresponding to the first scan. After Scan 1, the printing medium P is conveyed downstream in the Y-direction by a distance corresponding to a single ejection port group. After that, the second scan (Scan 2) is performed, ejecting the inks from the ejection ports belonging to the ejection port group A2 to the predetermined region 80 based on print data on each type of ink corresponding to the second scan. After that, the conveyance of the printing medium and the ejection from the printhead are performed alternately, ejecting the inks from the ejection ports belonging to the ejection port groups A3 to A6 to the predetermined region 80 in the third to sixth scans, respectively. In this way, multi-pass printing on the predetermined region 80 is completed.

<Controlling the Application Amount of the Reaction Liquid>

Figure 8:
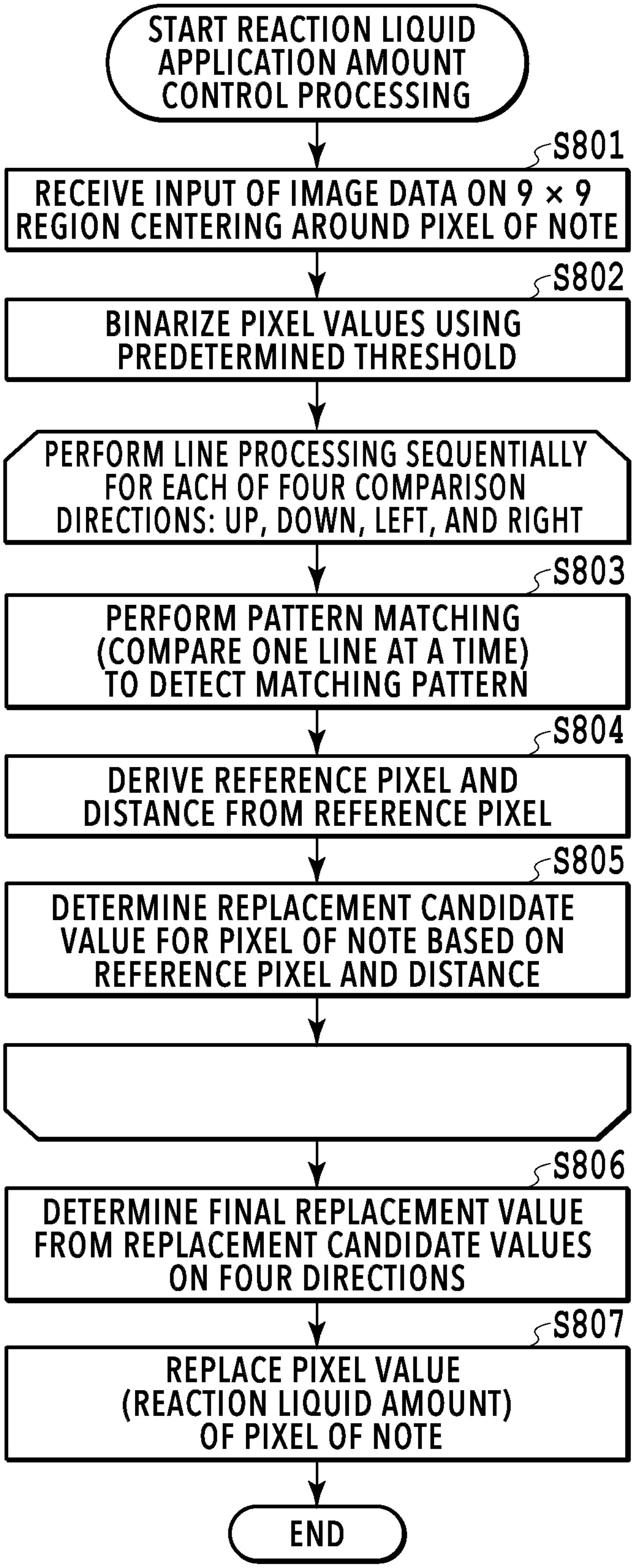
FIG. 8 is a flowchart of reaction liquid application amount control processing.

The following gives a detailed description of the reaction liquid application amount control processing J08 shown in FIG. 5. FIG. 8 is a flowchart of the reaction liquid application amount control processing.

In Step S801, reaction liquid application amount data (RCT) for detection is inputted and obtained. The data inputted and obtained in this step is image data on a predetermined area centering around a pixel to be processed (referred to as a pixel of note) or in other words, data on the pixel of note and neighboring pixels around the pixel of note (the predetermined area is, in the present example, a region with 9 pixels×9 pixels and is called a 9×9 region). Such a region of a predetermined size is referred to as a detection target region. The reason for obtaining data on the neighboring pixels in this step is to control, or to adjust (increase as needed), the reaction liquid application amount for the pixel of note depending on the reaction liquid application states for the neighboring pixels. Processing performed after S801 to be described later is estimation processing for estimating the degree of bleeding by performing pattern matching and bolding processing for expanding a region to apply the reaction liquid according to the degree of bleeding thus estimated. To be more specific, to detect a pattern, comparison processing is executed on the 9×9 region using pattern matching. Then, after completion of processing on a single pixel of note, the processing is performed on the next pixel of note. In this way, the processing is performed sequentially from one pixel of note to another. Also, the degree of bleeding is a degree of bleeding that may occur at the pixel position of a pixel of note. Note that "Step SXXX" is hereinafter written simply as "SXXX."

Note that the bolding processing refers to processing by which, near a border between a high-density region with a large amount of application of color inks and a low-density region with a small amount of application of color inks, the amount of reaction liquid applied to the low density region (which is relatively small) is increased based on the amount of reaction liquid applied to the high density region (which is relatively large). The bolding processing is also referred to as bolding herein. For example, processing to replace the amount of reaction liquid applied to a low-density region with the amount of reaction liquid applied to a high-density region near the above-described border is a type of bolding processing. As a result of such bolding processing, a relatively large reaction liquid application amount is assigned to a low-density region near the border. In other words, a region with a relatively large reaction liquid application amount spreads from a region where a large amount of color inks is applied toward a region where a small amount of color inks is applied, crossing over the above-described border. Also, a means that executes the bolding processing is called a bolding unit. Specifically, the bolding unit is the main control unit 300 and is the CPU 301.

In S802, binarization processing is performed on the reaction liquid application amount data (RCT). In this step, to the pixel value of each pixel included in the 9×9 region obtained in S801, 0 is allocated in a case where the pixel value is smaller than a predetermined threshold defined in advance, and 1 is allocated in a case where the pixel value is larger than the predetermined threshold. Although binarization is performed here to convert eight-bit representation into one-bit representation, it is to be noted that the representation of the pixel value obtained by the processing in this step is not limited to binary representation, and may be representation with three or more values (two bits or more). In this example, binarization is employed for the reason of simplifying detection patterns to be used in pattern matching in later processing.

Figure 9A:
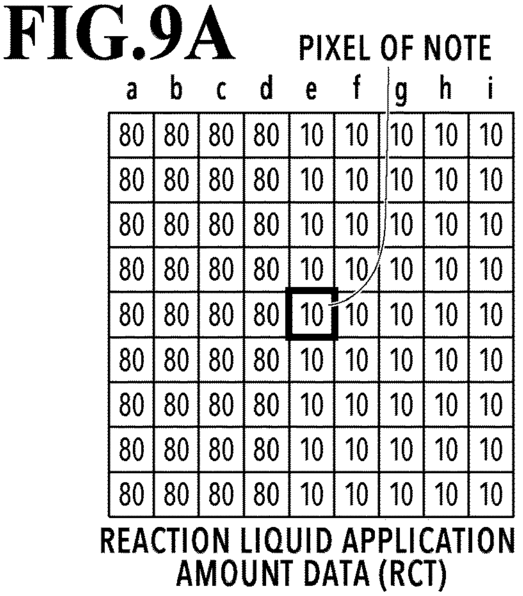
FIGS. 9A to 9E are diagrams illustrating pattern matching processing and bolding processing.
Figure 9D:
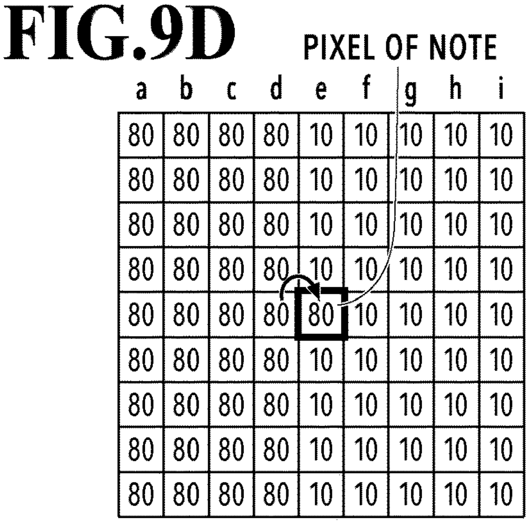
Figure 9B:
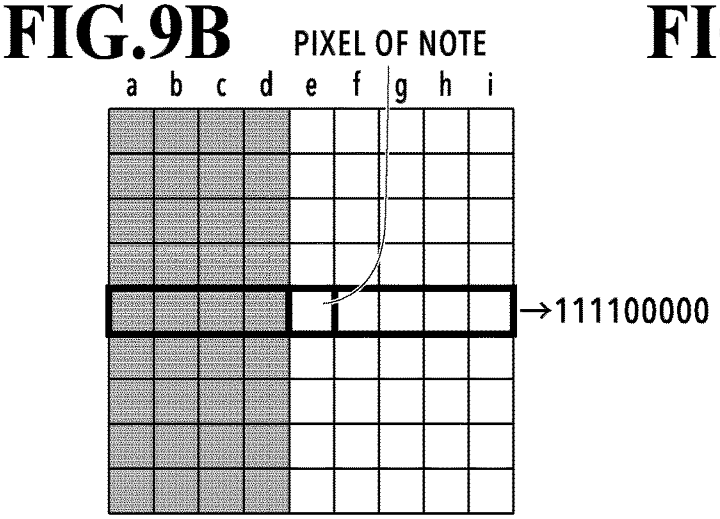

FIG. 9A shows the reaction liquid application amount data (RCT) on a region with 9 pixels×9 pixels centering around a pixel of note to be processed, and this reaction liquid application amount data has pixels whose value of the reaction liquid application amount is 80 and pixels whose value of the reaction liquid application amount is 10. FIG. 9B shows data obtained as a result of the binarization processing performed on the data in FIG. 9A using a threshold "20." The white regions in the binary image shown in FIG. 9B denote pixels with a reaction liquid application amount of 0 (a minimum value), and the black hatched regions denote pixels with a reaction liquid application amount of 1 (a maximum value).

In each of processes in S803 to S805 following the S802, processing is performed on lines of pixels including the pixel of note (referred to as line processing). The line processing is carried out in a plurality of directions of the image (in the present example, in four directions: 0 degrees, 180 degrees, 90 degrees, and 270 degrees). FIG. 9B shows a line of pixels used for 0-degree line determination among the 9×9 pixels centering around the pixel of note to be processed. Using FIG. 9B, first, processing for the 0-degree direction (from left to right) is described below.

In S803, pattern matching processing is performed on the binary image obtained in S802. In FIG. 9B, nine pixels on the single line including the pixel of note are represented as "111100000" using pixel values indicative of reaction liquid application amounts (as described earlier, the pixel values are each represented with one bit: the maximum value "1" or the minimum value of "0"). This pixel information on the single line is compared with detection patterns set in advance. The detection patterns here are each data having mask values and determination values (see FIG. 10). The mask values are used to convert the pixel value of a pixel to "0" in a case where the pixel is included in a line of pixels including a pixel of note and has a pixel value of "1" despite not being targeted for detection processing. The determination values are applied to pixel information on the nine pixels on the single line obtained by the masking processing and are used to determine whether the pixel information on the nine pixels on the single line matches the determination values. FIG. 10 shows detection patterns used in the present embodiment and concrete results of evaluation on a pixel of note in a case where the determination result is a match. Note that a region where the pixel value is 1 in a matched pattern is referred to as a body region or simply a body. Also, a pixel constituting a body region (a pixel whose pixel value is 1) is referred to as a body pixel. Further, a pixel not included in a body region (a pixel whose pixel value is 0) is referred to as a non-body pixel.

The following gives a detailed description of a process of the processing. In FIG. 9B, the line including the pixel of note is represented as "111100000." In the pattern matching, to this information on the single line, the detection patterns shown in FIG. 10 are sequentially applied from the top down (from a first detection pattern), and the pattern matching ends once a match is detected. As a result, the pixel of note is classified as a pixel of the matching detection pattern.

First, a first detection pattern is applied to the line "111100000" including the pixel of note. An AND operation performed on "111100000" and the mask values "111111000" of the first detection pattern yields "111100000" in which the pixel value of a pixel not targeted for detection processing is "0." Then, the result of the masking processing "111100000" is compared with the determination values "111110000" of the first detection pattern. As a result, it is determined that they do not match. This means that the pixel of note in FIG. 9B is determined not to be a "body pixel in a body with a width of 5 or more." Note that as to the "width of 5 or more," the width is expressed by the number of pixels, and the "width of 5 or more" means that there are five or more consecutive pixels with a pixel value of "1."

Next, a second detection pattern is applied to the line "111100000" including the pixel of note. An AND operation performed on "111100000" and the mask values "111110000" of the second detection pattern yields "111100000" in which the pixel value of a pixel not targeted for detection processing is "0." Then, the result of the masking processing "111100000" is compared with the determination values "111100000" of the second detection pattern. As a result, it is determined that they match. This means that the pixel of note in FIG. 9B is determined to be a "non-body pixel away from a body with a width of 4 or more by a distance of 1." Note that as to the "distance of 1," the distance is counted based on the center-to-center distance between pixels, and in a case where pixels are adjacent to each other, the count value of the distance between those adjacent is "1." Thus, in a case where there is a space of one pixel in between, the distance is counted as "2."

S804 is a step for identifying a body pixel closest to the pixel of note and deriving the distance between the pixel of note and the body pixel identified as being closest thereto. Hereinbelow, the body pixel identified as being the closest is also referred to as a "reference pixel." Also, the distance between the pixel of note and the body pixel identified as being closest thereto is also referred to as a "distance from the reference pixel (to the pixel of note)."

This step is described taking the case in FIG. 9B as an example. As described earlier, the pixel of note has been determined to match the 2nd detection pattern: a "non-body pixel away from a body with a width of 4 or more by a distance of 1." In this case, a body pixel closest to the pixel of note is the pixel at a position "d" (a pixel to the immediate left of the pixel of note), and this pixel is identified as a reference pixel. Also, this determines that the distance from the reference pixel to the pixel of note is "1." Note that the reference pixel and the distance from the reference pixel are also shown in FIG. 10 (see the right two columns).

In S805, a reaction liquid application amount replacement candidate value for the pixel of note is determined based on the reference pixel identified in S804 and the distance derived in S804. Specifically, in a case where the distance from the reference pixel is equal to or below a distance threshold set in advance, the value of the reaction liquid application amount for the reference pixel is used as a reaction liquid application amount replacement candidate value for the pixel of note. Note that this distance threshold is referred to as a replacement distance threshold.

This step is described taking the case in FIG. 9B as an example. Here, the replacement distance threshold is set to "2." The reference pixel is the pixel at the position of "d," and the distance from the reference pixel to the pixel of note is "1." In this case, the distance from the reference pixel≤the replacement distance threshold; hence, referring to FIG. 9A, the value of the reaction liquid application amount for the reference pixel, "80," is a replacement candidate value.

This is the pattern matching processing and the replacement candidate value determination processing that are performed for the 0-degree direction.

Figure 9E:
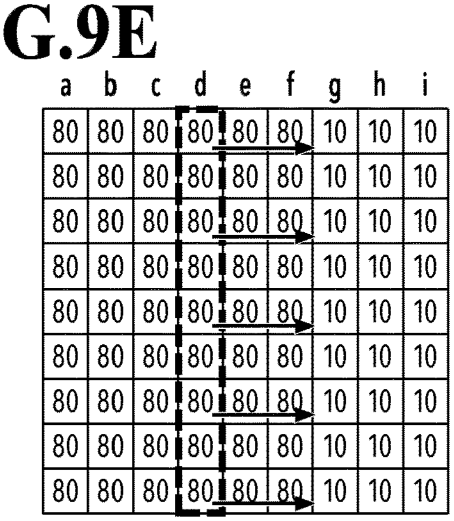
Figure 9C:
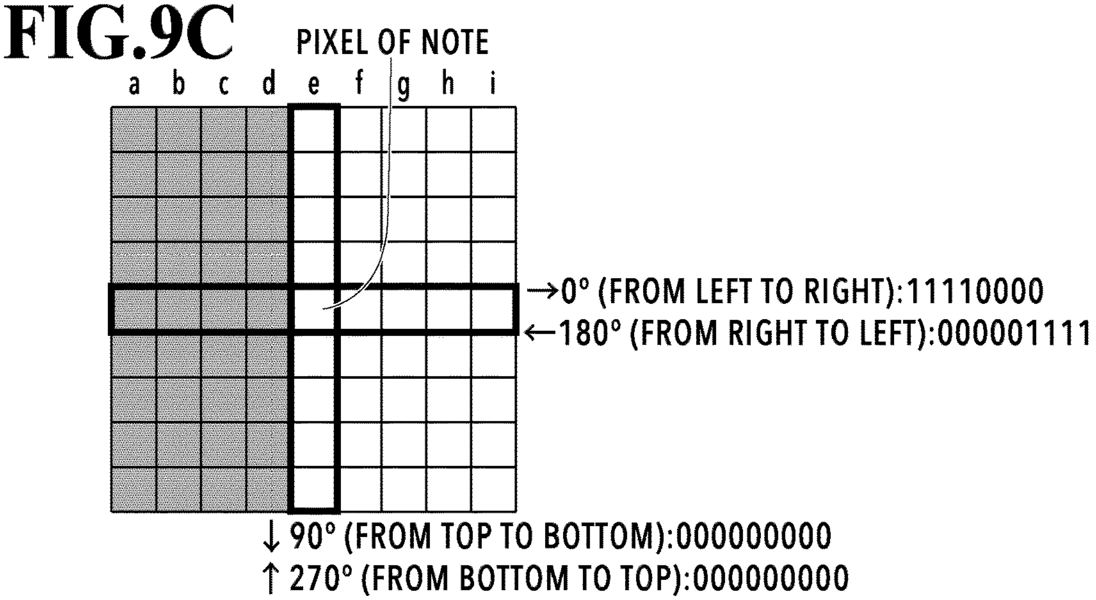

Next, processing for directions other than 0 degrees is described taking the case in FIG. 9C as an example. As described above, in the processing for the 0-degree direction (from left to right), the pixel of note is determined as being a "non-body pixel away from a body with a width of 4 or more by a distance of 1," and the replacement candidate value is determined to be "80."

Processing for the 180-degree direction is described. The pixel values on the single line including the pixel of note, obtained from right to left, are "000001111." The pattern matching processing is performed on this using the detection patterns similarly to the processing for the 0-degree direction described above. Then, the 1st to 17th detection patterns are a mismatch, and the pixel of note is determined to match the 18th detection pattern: "N/A (not applicable): a non-body pixel with no body region nearby." Thus, no reference pixel is identified, and as shown in FIG. 10, the replacement reference pixel is "N/A," and the distance from a reference pixel is "N/A." A replacement candidate value in this case is "0."

Processing for the 90-degree direction is described. The pixel values on the line including the pixel of note, obtained from top to bottom, are "000000000." The pattern matching processing is performed on this using the detection patterns similarly to the processing for the 0-degree direction described above. Then, the 1st to 17th detection patterns are a mismatch, and the pixel of note is determined to match the 18th detection pattern: "N/A: a non-body pixel with no body region nearby." Thus, no reference pixel is identified, and as shown in FIG. 10, the replacement reference pixel is "N/A,"

and the distance from a reference pixel is "NA." A replacement candidate value in this case is "0."

Processing for the 270-degree direction is described. The pixel values on the line including the pixel of note, obtained from bottom to top, are "000000000." The pattern matching processing is performed on this using the detection patterns similarly to the processing for the 0-degree direction described above. Then, the 1st to 17th detection patterns are a mismatch, and the pixel of note is determined to match the 18th detection pattern: "N/A: a non-body pixel with no body region nearby." Thus, no reference pixel is identified, and as shown in FIG. 10, the replacement reference pixel is "N/A," and the distance from a reference pixel is "N/A." A replacement candidate value in this case is "0."

In this way, in the present embodiment, feature information on each pixel is obtained using the 1st to 18th detection patterns shown in FIG. 10. This is synonymous with estimating the degree of bleeding for each pixel. For example, in a case where the pixel of note is a body pixel inside a body, its degree of bleeding can be estimated to be substantially zero or extremely small. By comparison, in a case where the pixel of note is a non-body pixel, its degree of bleeding is estimated to be intermediate or high. Thus, in FIG. 10, detection patterns indicating that the pixel of note is a non-body pixel have specific valid values to use for replacement written in the right two columns, whereas detection patterns indicating that the pixel of note is a body pixel have "N/A" written in those columns.

<<Reaction Liquid Application Amount Replacement Processing>>

In S806, a final value to replace the reaction liquid application amount for the pixel of note is determined based on the results of the processing for the four directions (the four replacement candidate values).

As described above, as a result of the line processing performed for the four directions in the case in FIG. 9C, the following replacement candidate values were obtained: "80" for 0 degrees, "0" for 180 degrees, "0" for 90 degrees, and "0" for 270 degrees. In the present embodiment, the largest one of the four candidate values is determined as the final replacement value. According to this rule, in the present example, the final replacement value for the pixel of note is determined to be "80."

In S807, the existing value for the pixel of note in the reaction liquid application amount data is replaced by the replacement value determined in S806. FIG. 9D shows the result.

Also, FIG. 9E is a diagram showing results obtained by the reaction liquid application amount control processing described above performed on all the pixels. FIG. 9E shows that, as a result of using the pixel value of a region with a large reaction liquid application amount for regions outside this region as well, the region with a large reaction liquid application amount has spread. In a case where the replacement distance threshold is set to "2," such spreading of the region with a larger reaction liquid application amount is by a distance of two pixels. Consequently, even in a case where there is a displacement in ink landing position by two pixels, the reaction liquid can come into contact with the color ink. This therefore makes it possible to reduce bleeding which may occur at a border between a plurality of images with different densities due to a shortage of the reaction liquid application amount.

In this way, the setting of the replacement distance threshold can determine the width to spread the region with a large reaction liquid application amount. Note that the replacement distance threshold may be set in advance considering the ink landing accuracy of the printing apparatus, the amount of landing displacement, and the like.

Note that the ink application amount of a color ink and the distance from an identified reference pixel can be regarded as the degree of bleeding of the pixel of note. It can be said that in the present embodiment, the reaction liquid application amount replacement candidate values are determined based on this degree of bleeding. Details of the degree of bleeding, such as its specific examples, will be described later. The processing of reaction liquid application amount control has thus been described.

Advantageous Effects of the Present Embodiment

As described above, the present embodiment determines how the reaction liquid is applied to pixels around a pixel of note by performing pattern matching on reaction liquid application amount data, and can increase the reaction liquid application amount for a region around a region with a large reaction liquid application amount. Thus, even in a case where there is a displacement in ink landing position, the present embodiment can reduce bleeding which may occur at a border between two regions with different color ink application amounts (i.e., densities) due to shortage of the reaction liquid application amount.

<First Modification (For a Region Sandwiched by Body Regions, the Largest One of a Plurality of Replacement Candidate Values is Selected)>

In the case described above using FIGS. 9A to 9E, a body region, which has a large reaction liquid application amount, is present only to the left of a pixel of note (the 0-degree direction). Here, a case where a pixel of note is sandwiched by two body regions is described.

FIGS. 11A to 11C show a case where a pixel of note is sandwiched by two body regions. This case is described as an example.

FIG. 11A is image data representing the reaction liquid application amounts of the respective pixels. Here, each pixel value is represented with eight bits. In the example in FIG. 11A, there are regions with a reaction liquid application amount of "80," regions with a reaction liquid application amount of "50," regions with a reaction liquid application amount of "10," and border portions between them.

FIG. 11B shows data on results of binarization processing performed on the data in FIG. 11A using a threshold "20."

For the 0-degree direction, the pixel values on a single line including a pixel of note, obtained from left to right, are "011000011." The pattern matching processing is performed on this using the detection patterns shown in FIG. 10. Then, the 10th detection pattern is a match, and the pixel of note is determined as being a "non-body pixel away from a body with a width of 2 by a distance of 2."

Next, for the 180-degree direction, the pixel values on the single line including the pixel of note, obtained from right to left, are "110000110." As a result of the pattern matching processing performed on this, the 9th detection pattern is a match, and the pixel of note is determined to be a "non-body pixel away from a body with a width of 2 or more by a distance of 3."

For the 90-degree and 270-degree directions, the pixel values on a single line including the pixel of note are "000000000," and thus, the pixel of note is determined to match the 18th detection pattern: "N/A: a non-body pixel with no body region nearby."

As described earlier, in S805, a reaction liquid application amount replacement candidate value for the pixel of note is determined based on the reference pixel identified in S804 and the distance derived in S804. The following describes determination of a replacement candidate value in a case where the replacement distance threshold set in advance is "3." As to the 0-degree direction, the distance from the reference pixel is "2," and therefore the distance from the reference pixel≤the replacement distance threshold. It means that the pixel of note qualifies for replacement, and the replacement candidate value is "80." As to the 180-degree direction, the distance from the reference pixel is 3, and therefore the distance from the reference pixel≤the replacement distance threshold. It means that the pixel of note qualifies for replacement, and the replacement candidate value is "50." As to the 90-degree and 270-degree directions, the pixel of note is determined to be "N/A: a non-body pixel with no body region nearby," and thus, their replacement candidate values are "0."

In S806, the final replacement value is determined from the plurality of replacement candidate values. In this determination, in order to have a necessary reaction liquid application amount, the largest one of the plurality of replacement candidate values is selected. According to this rule, because 80>50>0 in the present example, the final replacement pixel value is determined to be "80."

FIG. 11C shows final results obtained by the reaction liquid application amount replacement processing performed on the data in FIG. 11A. Because the replacement distance threshold is 3, for regions away from body regions by a distance of up to 3, "80" is used because it is the larger one of the replacement candidate values.

<Second Modification (The Detection Target Region is Extended)>

In the embodiment described above, a region around a pixel of note including the pixel of note, which is a pattern matching detection target region, is a 9×9 region centering round the pixel of note. However, the size of the detection target region is not limited to this. Any range sufficient for the number of pixels to be bolded may be set as a predetermined size of a detection target region. For example, in a 9×9 region, up to four pixels can be bolded. To make bolding up to eight pixels possible, the size of the detection target region is set to 17×17, and the mask values and the determination values are 17 bits. In other words, the vertical (or horizontal) width of a detection target region should be more than twice the number of pixels to be bolded, and the size of the detection target region is derived according to the vertical (horizontal) width=the number of pixels to be bolded+1.

For example, the detection target region may be determined according to the size of a landing displacement which may occur while the printing apparatus is performing printing. In a case where the landing displacement is estimated to be large because, e.g., the printing apparatus is designed to perform extremely fast printing or operated in a printing mode of performing extremely fast printing, a larger detection target region is preferably set.

Also, the size of the detection target region may be changed depending on the type of printing medium. For a printing medium with high wettability such that ink droplets are more likely to bleed thereon, a larger detection target region is preferably set in order to achieve wider bolding.

<Third Modification (The Replacement Distance Threshold to use is Changed According to the Printing Mode)>

In the replacement processing described in the above embodiment, in a case where the distance from a reference pixel to a pixel of note is equal to or below a replacement distance threshold set in advance, the existing pixel value (the reaction liquid application amount) of the pixel of note is replaced by the pixel value (the reaction liquid application amount) of the reference pixel. The replacement distance threshold used in this processing is determined based on the number of pixels to be bolded.

For example, the replacement distance threshold may be changed depending on the scan speed of the printhead. The faster the scan speed of the printhead, the larger a displacement between the landing positions of a color ink and a reaction liquid tends to be, and it is therefore favorable that the faster the scan speed of the printhead, the wider the width to be bolded. Widening the bold width can be achieved by increasing the replacement distance threshold. Specifically, for example, in a printing mode where the scan speed of the printhead is high, under the assumption that landing position displacement may occur over a distance of up to four pixels, the replacement distance threshold is set to "4." This enables four pixels to be bolded. Conversely, in a printing mode where the scan speed of the printhead is low, under the assumption that landing position displacement may occur over a distance of up to one pixel, and the replacement distance threshold is set to "1." This enables one pixel to be bolded.

Also, in the multi-pass printing method, typically, landing positions may be displaced more easily in the scanning direction of the printhead, but less likely in a direction perpendicular to the scanning direction of the printhead. Thus, preferably, for the directions horizontal to the scanning direction of the printhead, the replacement distance threshold is increased to bold a relatively wide area, whereas for the directions perpendicular to the scanning direction of the printhead, the replacement distance threshold is decreased to bold a relatively narrow area.

<Fourth Modification (Reaction Liquid Application Amount Replacement Candidate Values are Attenuated According to the Properties of a Printing Medium)>

In the embodiment described above, among regions with relatively small color ink application amounts, a border region adjacent to a region with a large color ink application amount is assigned a larger reaction liquid application amount than an inside region not adjacent to the region with a large color ink application amount. Also, although the same value as the reaction liquid application amount for a region with a large color ink application amount is used as the replacement candidate value for the pixel of note in the embodiment above, it does not have to be the same value.

For example, for a printing medium with low wettability such that ink droplets are less likely to bleed thereon, there is a tendency that the farther away from a reference pixel, the lower the degree of bleeding. Thus, in the determination of a replacement candidate value in S805, it is preferable that control be performed such that the replacement candidate value is reduced by being multiplied by an attenuation coefficient which is according to the distance from the reference pixel and corresponding to the degree of bleeding, so that the reaction liquid application amount may be increased not too much.

Specifically, for a pixel of note, attenuation coefficients according to the distances from a reference pixel are held in advance. The attenuation coefficient is 1 for a distance of 1, 0.75 for a distance of 2, 0.5 for a distance of 3, and so on. Then, the product of this attenuation coefficient and the pixel value (the reaction liquid application amount) of the reference pixel can be set as a replacement candidate value.

Also, degrees of bleeding according to the distances from a reference pixel may be held in advance. For example, degrees of bleeding are expressed by values from 0 to 100: a degree of bleeding is 100 for a distance of 1, 75 for a distance of 2, 50 for a distance of 3, and so on. Then, the attenuation coefficient may be 1 (100/100) for a distance of 1, 0.75 (75/100) for a distance of 2, and 0.5 (50/100) for a distance of 3. Then, the product of this attenuation coefficient and the pixel value (the reaction liquid application amount) of the reference pixel can be set as a replacement candidate value.

Also in the present modification, the replacement distance threshold may be reduced to have a narrow width for bolding, as described above.

<Fifth Modification (Processing Performed According to the Width of a Body.)>

Especially with a medium with high wettability, bleeding may appear very differently depending on the shape of a body region, such as, for example, a one-pixel-width line.

Typically, in a case where the shape of a body region is linear, the pixel values of the body region are high in density. Thus, focusing on each pixel, a large amount of color ink and a large amount of reaction liquid are applied. In a case where the processing to bold the reaction liquid application amounts is performed on such a shape, focusing on an area with a certain size including the line, the ratio of the reaction liquid application amount in relation to the color ink application amount for the line becomes extremely high, and although reaction and flocculation occur, the viscosity does not increase, and bleeding cannot be reduced.

The thinner the line is, more notable the imbalance of the ratio between the color material and the reactant becomes, which rather causes bleeding and lowers the quality of the line. To address this negative effect, it is preferable to estimate the degree of bleeding based on the width of the body and change the strength of bolding accordingly.

Figure 12A:
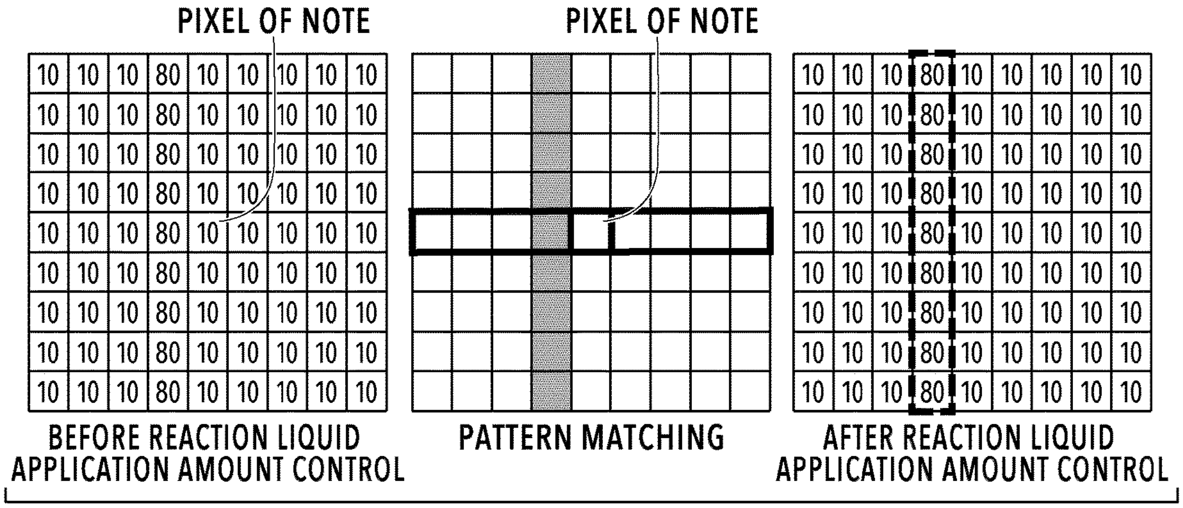
FIGS. 12A to 12C are diagrams illustrating pattern matching processing and bolding processing that are performed on a line.
Figure 12B:
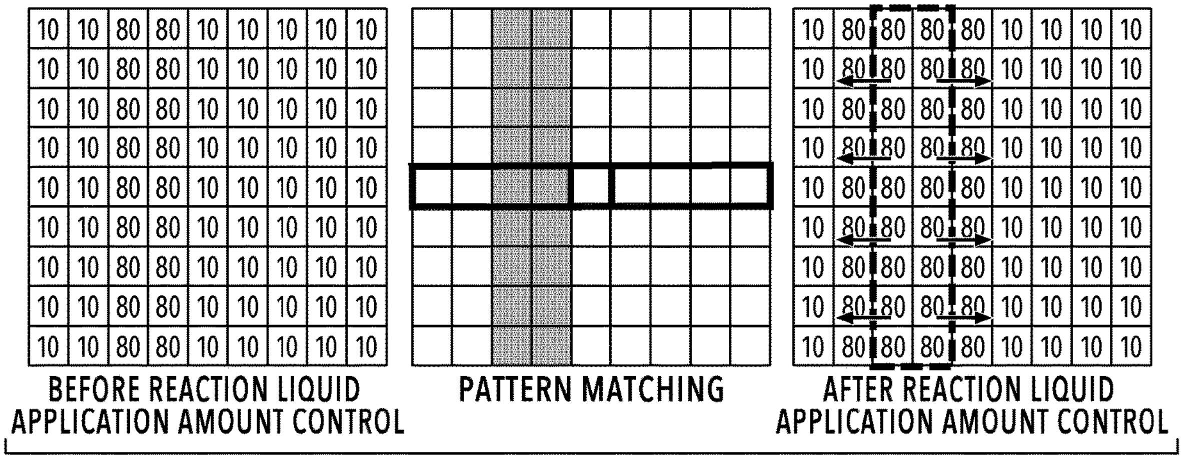
Figure 12C:
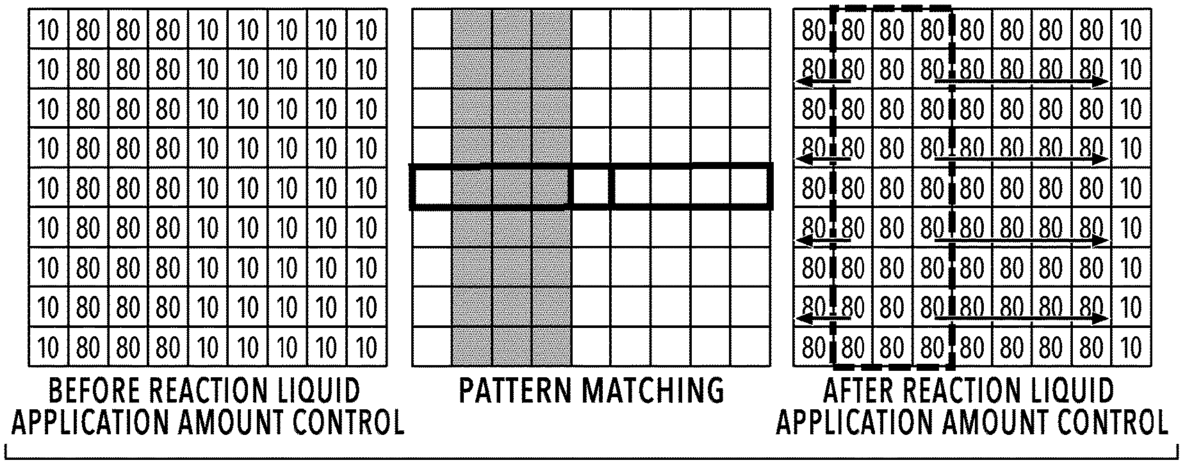

This point is described using FIGS. 12A to 12C. FIGS. 12A to 12C show how the reaction liquid application amount bolding processing is performed depending on the width of a line. A pixel of note in FIG. 12A matches the 16th detection pattern: a "non-body pixel away from a body with a width of 1 by a distance of 1." Also, a pixel of note in FIG. 12B matches the 11th detection pattern: a "non-body pixel away from a body with a width of 2 by a distance of 1," and a pixel of note in FIG. 12C matches the 16th detection pattern: a "non-body pixel away from a body with a width of 3 by a distance of 1."

In the present modification, the replacement distance threshold is changed according to the width of a body. The narrower the width of the body, the higher the degree of bleeding, and therefore, a smaller replacement distance threshold needs to be set. For example, control is performed such that the replacement distance threshold is set to 0 in a case where the body has a width of 1, to 1 in a case where the body has a width of 2, and to 4 in a case where the body has a width of 3 or more. In this case, because the width of the body is 1 in FIG. 12A, the replacement distance threshold is 0, and bolding is not performed. Because the width of the body is 2 in FIG. 12B, the replacement distance threshold is 1, and one pixel is bolded in each of the left and right directions. Because the width of the body is 3 in FIG. 12C, the replacement distance threshold is 4, and up to four pixels are bonded in each of the left and right directions. Specifically, four pixels are bolded in the right direction, and only one pixel is bolded in the left direction.

Also, in a case where the width of a body is narrow in relation to a width to be bolded, increasing the reaction liquid application amount may rather increase the possibility of bleeding occurring. Thus, control may be performed such that bolding is not performed in a case where the width of a body is narrow in relation to the width to be bolded.

Also, processing may be performed to multiply the replacement candidate value by an attenuation coefficient according to the width of a body. For example, the replacement candidate value is multiplied by an attenuation coefficient of 0.1 in a case where the body has a width of 1, an attenuation coefficient of 0.5 in a case where the body has a width of 2, an attenuation coefficient of 1.0 in a case where the body has a width of 3 or more, and so on.

Also, with the degree of bleeding being expressed by a value from 0 to 100, the degree of bleeding may be set to 10 for a body with a width of 1, to 50 for a body with a width of 2, and to 100 for a body with a width of 3, and an attenuation coefficient may be calculated based on the degree of bleeding. The attenuation coefficient is set to 0.1 (10/100) in a case where the width is 1, 0.5 (50/100) in a case where the width is 2, and 1.0 (100/100) in a case where the width is 3.

<Sixth Modification (Processing Performed According to the Amount of Color Ink Applied to a Body Region)>

The replacement candidate values may be attenuated according to the amount of color ink applied to the body region. The smaller the amount of color ink applied to the body region, the harder it is to reduce bleeding by increasing the reaction liquid application amount, and it is therefore estimated that the degree of bleeding is high. Specifically, the attenuation coefficient by which to multiply the replacement candidate value is determined according to the color ink application amount at the position of a reference pixel belonging to the body region. This can be achieved by using, for example, a one-dimensional lookup table defining the correspondence relation between the color ink application amount for the reference pixel and the attenuation coefficient.

Also, as described above, in a case where a body has a narrow width, the smaller the color ink application amount, the higher the degree of bleeding is estimated to be. Conversely, in a case where a body has a wide width, the larger the color ink application amount, the higher the degree of bleeding is estimated to be. Thus, the attenuation coefficient is calculated based on three variables, the width of the body, the distance from the body, and the color ink application amount for the body. This enables images with various widths or various densities to be covered. The calculation of the attenuation coefficient based on the three variables can be achieved by computation using a three-dimensional lookup table.

As described above, controlling the reaction liquid application amount appropriately makes it possible to reduce bleeding occurring on a region with a large area and a high density on a low-permeability printing medium and to form a precise line image maintaining the resolution.

<Seventh Modification (The Pattern Matching Processing is Performed in More than Four Directions)>

Although the embodiment described above shows a case where the pattern matching processing is performed in four directions which are upward, downward, leftward, and rightward, the present embodiment is not limited to this. Expanding the control to have a plurality of directions including oblique directions such as an oblique direction of 30 degrees (or an integral multiple thereof) or an oblique direction of 45 degrees (or an integral multiple thereof) further improves the effect of reducing bleeding occurring in the oblique directions.

<Eighth Modification (Image Data is Vector Data in Detection of a Line)>

In the case described in the above embodiment, input image data is raster data such as a photograph image or a poster image. However, input image data may be vector data such as a CAD image. In that case, the degree of bleeding on a pixel of note may be estimated not by performing the pattern matching processing described above, but by using line information and line width information included in the vector data.

<Ninth Modification (Filtering Processing Upon Detection of a Line.)>

The degree of bleeding of a pixel of note is estimated by pattern matching processing in the embodiment described above, but it is also possible to estimate the degree of bleeding using a typical edge extraction filter or a typical blur filter. The reaction liquid application amount can be controlled to suit individual usage situations by changing the size the size of a thin line determination filter for each printing apparatus, each printing medium, each printing mode (or in other words, printing speed), or each of different combinations of these.

Also, a bolding method using a maximum-value filter may be employed. In this method as well, the reaction liquid application amount can be controlled to suit individual usage situations by changing the filter size for each printing apparatus, each printing medium, each printing mode (or in other words, printing speed), or each of different combinations of these.

<Tenth Modification (How to Create a Binary Image for Pattern Matching)>

In the embodiment described above, image data on reaction liquid application amounts are binarized using a threshold prepared in advance, and pattern matching processing is performed on the binary image obtained by the binarization. However, an image for pattern matching is not limited to this binary image.

For example, on an input RGB image, the color ink application amount is large on a low brightness portion, and more reaction liquid needs to be applied accordingly. Thus, based on this premise, a binary image according to the brightness levels in the input RGB image may be created, and the pattern matching processing may be performed using the created binary image.

Also, for example, on a CMYK ink image, a necessary application amount of reaction liquid increases in accordance with the total value of CMYK. Thus, a binary image may be created based on the total values of the CMYK inks, and the pattern matching processing may be performed using the created binary image.

Also, for example, reaction liquid application amount data for C, reaction liquid application amount data for M, reaction liquid application amount data for Y, and reaction liquid application amount data for K are created as reaction liquid application amount data corresponding to C signal data, M signal data, Y signal data, and K signal data, respectively. Then, pattern matching processing may be performed using the created reaction liquid application amount data to achieve bolding of reaction liquid application region.

Also, for example, in a case where input image data is vector data, a binary image may be created using line information, line width information, and fill information included in the vector data, and the pattern matching processing may be performed using the created binary image.

Second Embodiment

In the first embodiment, control for reducing border bleeding at a border between two regions, a light color region and a dark color region, is described in detail. By comparison, the present embodiment assumes a case where the pixel values of a plurality of pixels forming a single body are not the same value but different values. The following describes reaction liquid application amount control performed in such a case so that an appropriate amount of reaction liquid may be applied to an image formed by three or more color regions having different densities from one another.

<Using Two Thresholds for Binarization>

FIG. 13A is image data representing reaction liquid application amounts. Here, each pixel value is expressed with eight bits. In the present embodiment, as described above, bleeding at boarders between three or more color regions with different densities from one another is reduced in a case where the pixel values of a plurality of pixels forming a single body are not the same value but different values. In the example in FIG. 13A, there are regions with a reaction liquid application amount of "80," regions with a reaction liquid application amount of "50," regions with a reaction liquid application amount of "10," and border portions therebetween. In the following description, the width (the number of pixels) to bold is two pixels.

FIG. 13B shows data on results of binarization processing performed on the data in FIG. 13A using a threshold "10." FIG. 13C shows results of bolding processing performed on the data in FIG. 13B as part of the reaction liquid application amount control processing described in the first embodiment. In FIG. 13C, each of the pixels is set as a pixel of note, a body pixel closest to the pixel of note is identified as a reference pixel, and reaction liquid application amount replacement processing is performed. As a result, two pixels adjacent to "80" to the left are replaced by "80." Also, two pixels adjacent to "50" to the right are replaced by "50." However, in the replacement processing in FIG. 13C, the bolding processing of reaction liquid application amount is not performed at a border between "80" and "50" in the original image shown in FIG. 13A. Thus, should landing displacement occur at the border portion, bleeding attributable to the landing displacement cannot be reduced.

By comparison, FIG. 13D shows data on results of binarization processing performed on the data in FIG. 13A using a threshold "70." FIG. 13E shows results of bolding processing performed on the data in FIG. 13D as part of the reaction liquid application amount control processing described in the first embodiment. In the case in FIGS. 13D and 13E, only pixels with a pixel value "80" are detected as reference pixels, and thus, the bolding is done with a pixel value "80." However, this does not allow the bolding processing of the reaction liquid application amount to be performed at a border portion between "50" and "10" in the original image shown in FIG. 13A, and bleeding attributable to landing displacement cannot be reduced at this border portion.

FIG. 13F shows a result of the image in FIG. 13C and the image in FIG. 13E being merged in such a manner that each pixel is determined by selecting the larger one of the pixel values. FIG. 13F shows that as a result of the merge, sufficient amounts of reaction liquid are now applied to both of a border portion between "80" and "50" and a border portion between "50" and "10."

In this way, a plurality of binary images for pattern matching are created using a plurality of thresholds, and the bolding processing is performed using each of the binary images created. Then, the images obtained by the bolding processing are merged so that the largest value between the plurality of results of the bolding processing may be selected for each pixel. This makes it possible to reduce bleeding at a border between three or more color regions with different densities from one another.

Although the embodiment described above uses two thresholds, the processing may be performed using even more thresholds. Then, even with an image with more gradual density tones in one body, bleeding can be reduced at a border between regions with different densities.

<Performing Pattern Matching Processing Using Three Or More Values>

The pattern matching processing may be performed using three or more values. To be more specific, although the mask values and the determination values prepared are each represented with two values in one bit (0, 1) in the first embodiment, these values may be represented with two or more bits. For example, in a case of preparing the mask values and the determination values with three or more values, they may be represented with two bits, so that each detection pattern is defined using "00," "01," "10," and "11."

FIG. 14 shows example detection patterns in which each mask value is represented with two values ("00" or "11"), each determination value is represented with three values ("00," "01," or "10"), and a detection target region for pattern matching is a 5×5 region. The mask values and the determination values are represented by data of a total of ten bits (two bits×five pixels). For the mask values, a pixel in a detection target region is allocated "11," and a pixel outside a detection target region is allocated "00." For the determination values, a body 2 with a width of 2 or more is allocated "10" as a region with a large reaction liquid application amount, a body 1 with a width of 1 is allocated "01" as a region with an intermediate reaction liquid application amount, and a non-body is allocated "00" as a region with a small reaction liquid application amount. By using the 1st to 13th detection patterns exemplified here, adjacence between a body 2 and a body 1, adjacence between a body 2 and a non-body, and adjacence between a body 1 and a non-body can be detected. The above setting enables borders between three or more color regions with different densities from one another to be detected with pattern matching, and bolding processing can be performed appropriately.

Advantageous Effects of the Present Embodiment

As thus described, the present embodiment can appropriately apply the reaction liquid to an image formed by three or more color regions with different densities from one another and therefore can reduce bleeding occurring at borders between the color regions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can reduce bleeding occurring near borders between a plurality of image regions with different color ink densities.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-044721, filed Mar. 20, 2023, which is hereby incorporated by reference herein in its entirety.

What is claimed is:

1. A printing apparatus comprising:

a printhead that ejects a color ink and a reaction liquid for reacting with the color ink;

an application amount control unit that controls a reaction liquid application amount by, in image data representing the reaction liquid application amount of each pixel, estimating a degree of bleeding for each pixel and then, according to the estimated degree of bleeding, executing bolding processing near a border between a plurality of image regions having different densities of the color ink from each other, the plurality of image regions being a first region having a first density of the reaction liquid and a second region having a second density of the reaction liquid which is lower than the first density of the reaction liquid, the bolding processing being increasing the reaction liquid application amount assigned to the second region based on the reaction liquid application amount assigned to the first region; and a color conversion unit that creates color ink application amount data representing a color ink application amount for each pixel by performing color conversion processing on image data inputted, wherein the color conversion unit (1) creates first reaction liquid application amount data representing the reaction liquid application amount for each pixel based on the color ink application amount data and (2) sends the created first reaction liquid application amount data to the application amount control unit.

2. The printing apparatus according to claim 1, wherein the application amount control unit uses the first reaction liquid application amount data and estimates the degree of bleeding of a pixel of note based on the reaction liquid application amount for the pixel of note and the reaction liquid application amounts for neighboring pixels around the pixel of note.

3. The printing apparatus according to claim 2, wherein the application amount control unit creates second reaction liquid application amount data by replacing the reaction liquid application amount for the pixel of note in the first reaction liquid application amount data with a largest value of the reaction liquid application amounts for the neighboring pixels.

4. The printing apparatus according to claim 2, wherein the application amount control unit obtains a detection target region from the first reaction liquid application amount data, the detection target region being image data formed by pixels included in a region of a predetermined size centering around the pixel of note.

5. The printing apparatus according to claim 4, wherein the predetermined size of the detection target region is set based on a number of pixels to be bolded.

6. The printing apparatus according to claim 4, wherein the application amount control unit performs binarization processing on each of the pixels forming the image data of the predetermined size and thereby obtains a binary image where each pixel is represented with "0" or "1".

7. The printing apparatus according to claim 6, wherein the binarization processing is performed using two thresholds to obtain two of the binary images, and wherein the binary images obtained are merged.

8. The printing apparatus according to claim 6, wherein using the binary image, the application amount control unit performs pattern matching processing on a line of pixels including the pixel of note.

9. The printing apparatus according to claim 8, wherein as a result of the pattern matching processing, the pixel of note is classified as one of a plurality of detection patterns defining pixel characteristics.

10. The printing apparatus according to claim 9, wherein the plurality of detection patterns are each data having a mask value and a determination value, wherein the mask value is used to convert a pixel value of a pixel to "0" in a case where the pixel is included in the line of pixels including the pixel of note and has "1" as the pixel value despite not being targeted for detection processing, and wherein the determination value is applied to pixel information on the pixels included in the line of pixels obtained by masking processing and used to determine whether the determination value matches the pixel information on the pixels.

11. The printing apparatus according to claim 10, wherein the mask value and the determination value are each represented by a combination of one-bit values or a combination of two-bit values.

12. The printing apparatus according to claim 9, wherein each of the plurality of detection patterns defines characteristics of a pixel of note in the binary image and is defined by information indicating whether the pixel of note belongs to a body region which is a region where a pixel value is "1," information on a distance from the body region to the pixel of note in a case where the pixel of note has a pixel value of "0" and does not belong to the body region, and information on a width of the body region irrespective of the pixel value, and wherein one of the plurality of detection patterns defines that the pixel of note is a pixel with no body region nearby and having a pixel value of "0".

13. The printing apparatus according to claim 12, wherein in a case where the pixel of note in the binary image is detected as a non-body pixel having a pixel value of "0," the application amount control unit determines a replacement candidate value to replace the reaction liquid application amount for the pixel of note if a distance between the pixel of note and a reference pixel belonging to the body region and being closest to the pixel of note is equal to or below a replacement distance threshold.

14. The printing apparatus according to claim 13, wherein depending on a printing mode, the application amount control unit changes the replacement distance threshold to use.

15. The printing apparatus according to claim 13, wherein depending on the width of the body region, the application amount control unit changes the replacement distance threshold to use.

16. The printing apparatus according to claim 13, wherein depending on the color ink application amount for the reference pixel, the application amount control unit determines an attenuation coefficient by which to multiply the replacement candidate value.

17. The printing apparatus according to claim 13, wherein as an angle of the line of pixels including the pixel of note, angles in a plurality of directions are set, and wherein the application amount control unit performs the pattern matching for each of the angles in the plurality of directions.

18. The printing apparatus according to claim 17, wherein the angles in the plurality of directions include 0 degrees, 180 degrees, 90 degrees, and 270 degrees.

19. The printing apparatus according to claim 17, wherein the angles in the plurality of directions further include an angle in an oblique direction.

20. The printing apparatus according to claim 19, wherein a plurality of the replacement candidate values are determined as a result of the pattern matching processing performed on each of the angles in the plurality of directions.

21. The printing apparatus according to claim 13, wherein the replacement candidate value is attenuated based on a property of a printing medium.

22. The printing apparatus according to claim 13, wherein the application amount control unit determines a largest one of a plurality of the replacement candidate values as the replacement candidate value to replace the reaction liquid application amount for the pixel of note.

23. The printing apparatus according to claim 1, wherein the application amount control unit estimates the degree of bleeding using an edge extraction filter or a blur filter.

24. The printing apparatus according to claim 1, wherein the input image data is vector data, and wherein the application amount control unit estimates the degree of bleeding using line information and line width information included in the vector data.

25. The printing apparatus according to claim 2, wherein the application amount control unit performs pattern matching processing on a line of pixels including the pixel of note using a binary image, and wherein the binary image is created based on brightness levels in input image data or total values of application amounts of the color inks.

26. A method for controlling a printing apparatus, the printing apparatus including (1) a printhead that ejects a color ink and a reaction liquid for reacting with the color ink, (2) an application amount control unit, and (3) a color conversion unit that creates color ink application amount data representing a color ink application amount for each pixel by performing color conversion processing on image data inputted, the method comprising:

controlling, by the application amount control unit, of a reaction liquid application amount by, in image data representing the reaction liquid application amount of each pixel, estimating a degree of bleeding and then, according to the estimated degree of bleeding, executing bolding processing near a border between a plurality of image regions having different densities of the color ink from each other, the plurality of image regions being a first region having a first density of the reaction liquid and a second region having a second density of the reaction liquid which is lower than the first density of the reaction liquid, the bolding processing being increasing the reaction liquid application amount assigned to the second region based on the reaction liquid application amount assigned to the first region; and by the color conversion unit, (1) creating first reaction liquid application amount data representing the reaction liquid application amount for each pixel based on the color ink application amount data and (2) sending the created first reaction liquid application amount data to the application amount control unit.

27. A non-transitory computer-readable storage medium storing a program for causing a computer to execute a method for controlling a printing apparatus, the printing apparatus including (1) a printhead that ejects a color ink and a reaction liquid for reacting with the color ink, (2) an application amount control unit, and (3) a color conversion unit that creates color ink application amount data representing a color ink application amount for each pixel by performing color conversion processing on image data inputted, the method comprising:

controlling, by the application amount control unit, of a reaction liquid application amount by, in image data representing the reaction liquid application amount of each pixel, estimating a degree of bleeding and then, according to the estimated degree of bleeding, executing bolding processing near a border between a plurality of image regions having different densities of the color ink from each other, the plurality of image regions being a first region having a first density of the reaction liquid and a second region having a second density of the reaction liquid which is lower than the first density of the reaction liquid, the bolding processing being increasing the reaction liquid application amount assigned to the second region based on the reaction liquid application amount assigned to the first region; and by the color conversion unit, (1) creating first reaction liquid application amount data representing the reaction liquid application amount for each pixel based on the color ink application amount data and (2) sending the created first reaction liquid application amount data to the application amount control unit.

* * * * *